US012641251B2

(12) United States Patent
Ma et al.

(10) Patent No.: US 12,641,251 B2
(45) Date of Patent: *May 26, 2026

(54) METHODS AND DEVICES FOR LOSSLESS CODING MODES IN VIDEO CODING

(71) Applicant: BEIJING DAJIA INTERNET INFORMATION TECHNOLOGY CO., LTD., Beijing (CN)

(72) Inventors: Tsung-Chuan Ma, San Diego, CA (US); Xianglin Wang, San Diego, CA (US); Xiaoyu Xiu, San Diego, CA (US); Yi-Wen Chen, San Diego, CA (US); Hong-Jheng Jhu, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/898,660

(22) Filed: Sep. 26, 2024

(65) Prior Publication Data

US 2025/0030872 A1    Jan. 23, 2025

Related U.S. Application Data

(63) Continuation of application No. 17/727,626, filed on Apr. 22, 2022, now Pat. No. 12,143,597, which is a
(Continued)

(51) Int. Cl.
| | |
|---|---|
| *H04N 19/00* | (2014.01) |
| *H04N 19/119* | (2014.01) |
| *H04N 19/124* | (2014.01) |

| | |
|---|---|
| *H04N 19/129* | (2014.01) |
| *H04N 19/132* | (2014.01) |
| *H04N 19/157* | (2014.01) |
| *H04N 19/176* | (2014.01) |

(Continued)

(52) U.S. Cl.
CPC ......... *H04N 19/157* (2014.11); *H04N 19/119* (2014.11); *H04N 19/124* (2014.11); *H04N 19/129* (2014.11); *H04N 19/132* (2014.11); *H04N 19/176* (2014.11); *H04N 19/513* (2014.11); *H04N 19/577* (2014.11); *H04N 19/70* (2014.11)

(58) Field of Classification Search
None
See application file for complete search history.

(56) References Cited

U.S. PATENT DOCUMENTS

2017/0180737 A1* 6/2017 Ye .......................... H04N 19/70

OTHER PUBLICATIONS

International Search Report of International Application No. PCT/US2020/057172 dated Feb. 10, 2021, (3p).
(Continued)

*Primary Examiner* — Zhihan Zhou
(74) *Attorney, Agent, or Firm* — Arch & Lake LLP

(57) ABSTRACT

Methods, apparatuses, and non-transitory computer-readable storage mediums are provided for decoding a video signal. A decoder partitions a video picture into a plurality of coding units (CUs) comprising a lossless CU. The decoder may further receive a high-level syntax. The high-level syntax may include, for example, a first flag that indicates whether a residual coding scheme is switchable.

20 Claims, 11 Drawing Sheets

Related U.S. Application Data continuation of application No. PCT/US2020/057172, filed on Oct. 23, 2020.

(60) Provisional application No. 62/946,414, filed on Dec. 10, 2019, provisional application No. 62/925,216, filed on Oct. 23, 2019.

(51) Int. Cl.
| | | |
|---|---|---|
| *H04N 19/513* | (2014.01) | |
| *H04N 19/577* | (2014.01) | |
| *H04N 19/70* | (2014.01) | |

(56) References Cited

OTHER PUBLICATIONS

LG Electronics Inc., Jungah Choi et al., "AHG18 : Residual coding for lossless video coding," Joint Video Experts Team (JVET) of ITU-T SG 16 WP 3 and ISO/IEC JTC 1/SC 29/WG 11, JVET-P0466-v3, 16th Meeting: Geneva, Oct. 7, 2019, (6p).

Kwai Inc, Tsung-Chuan Ma et al., "AHG18: Disabling DMVR and BDOF for lossless coding," Joint Video Experts Team (JVET) of ITU-T SG 16 WP 3 and ISO/IEC JTC 1/SC 29/WG 11, JVET-P0521, 16th Meeting: Geneva, Oct. 6, 2019, (2p).

Tsung-Chuan Ma et al., "AHG18: On residual scanning order for lossless coding," Joint Video Experts Team (JVET) of ITU-T SG 16 WP 3 and ISO/IEC JTC 1/SC 29/WG 11, JVET-P0528, 16th Meeting: Geneva, Oct. 5, 2019, (2p).

Tsung-Chuan Ma et al., "AHG18: Residual coding selection signaling for lossles VVC," Joint Video Experts Team (JVET) of ITU-T SG 16 WP 3 and ISO/IEC JTC 1/SC 29/WG 11, JVET-P0525, 16th Meeting: Geneva, Oct. 7, 2019, (4p).

The Partial Supplementary European Search Report issued in Application No. 20880167.0 dated Jul. 24, 2023, (17p).

Yih Han Tan, "Non-RCE 3: Unified lossless residual coding," Joint Collaborative Team on Video Coding (JCT-VC) of ITU-T SG 16 WP 3 and ISO/IEC JTC 1/SC 29AVG 11, JCTVC-O0087, 15th Meeting: Geneva, CH, Oct. 23-Nov. 1, 2013, (6p).

LG Electronics Inc., Jungah Choi et al., "AHG18 : Residual coding for lossless video coding," JVET-P0466. (6p).

* cited by examiner

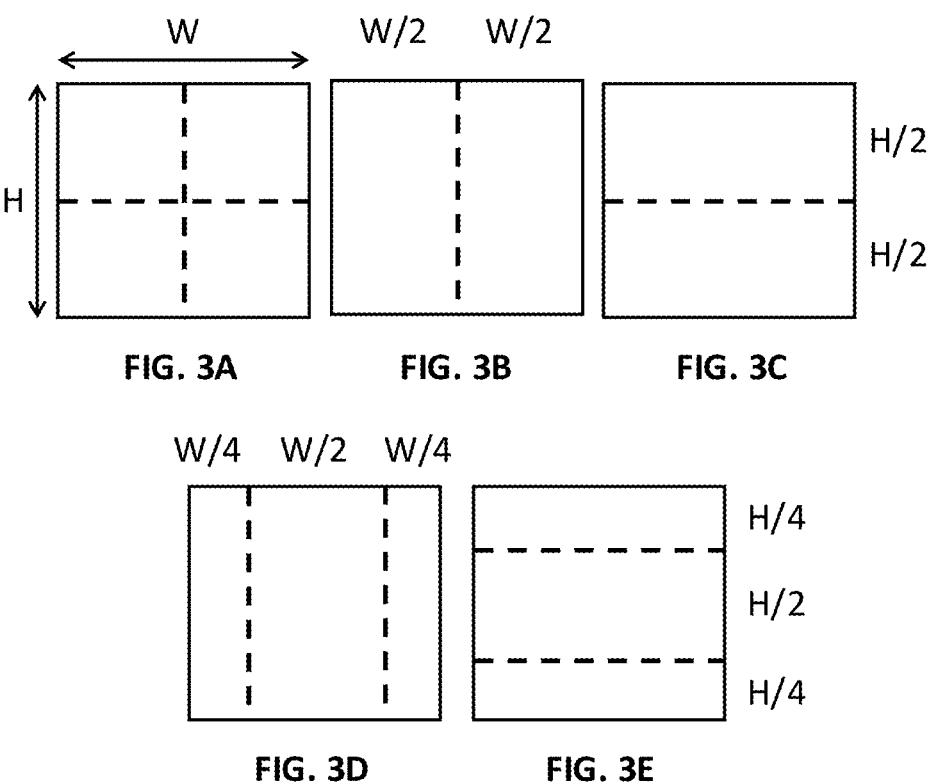
FIG. 3A          FIG. 3B          FIG. 3C
FIG. 3D          FIG. 3E
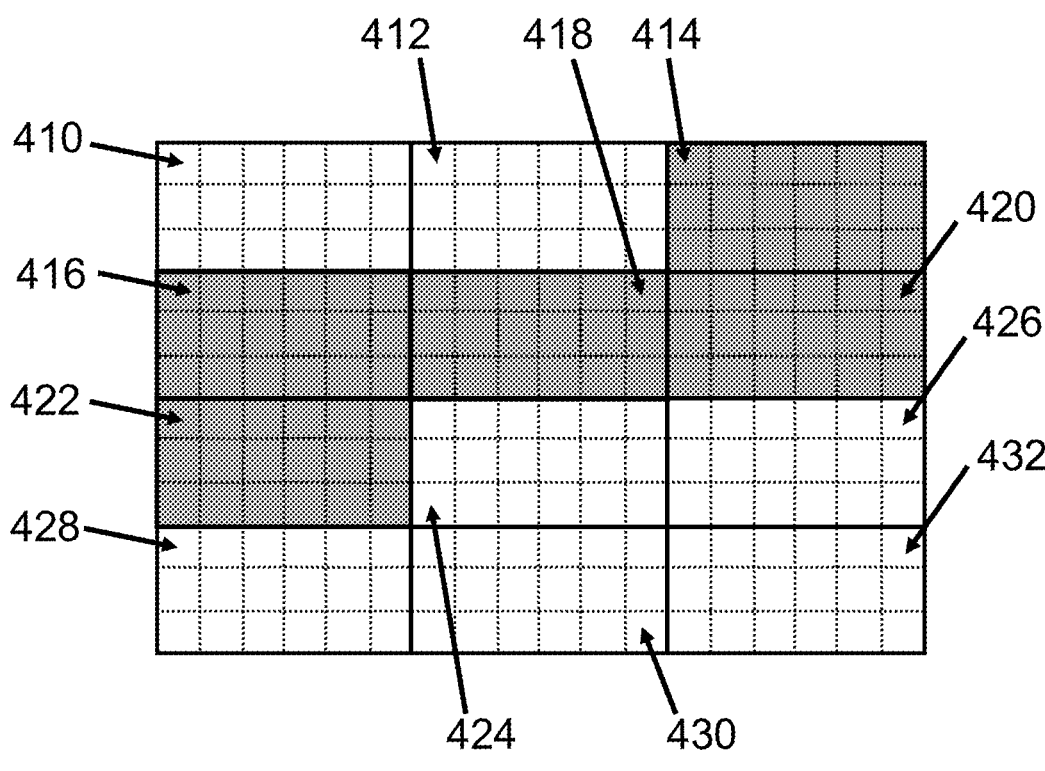
FIG. 4

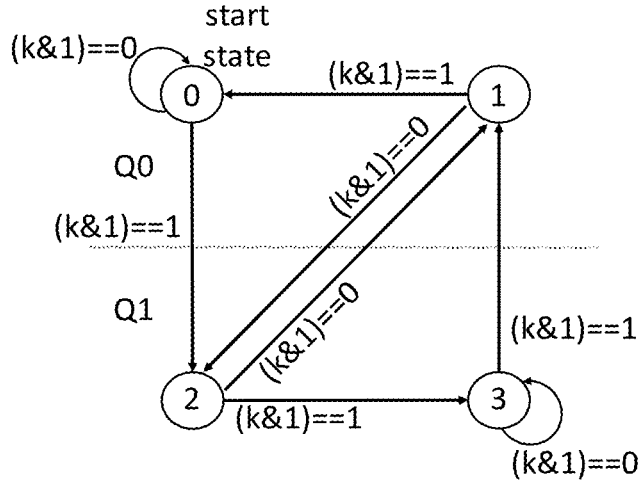
FIG. 10A
| Current | next state for ... | |
| state | (k&1)==0 | (k&1)==1 |
|---|---|---|
| 0 | 0 | 2 |
| 1 | 2 | 0 |
| 2 | 1 | 3 |
| 3 | 3 | 1 |
FIG. 10B
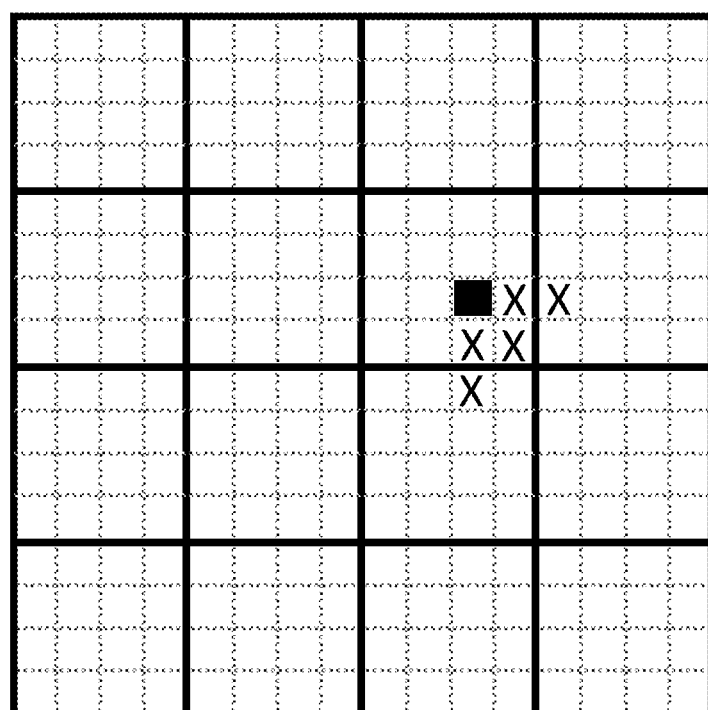
FIG. 11

1300

| Partitioning a video picture into a plurality of coding units (CUs) comprising a lossless CU. <u>1310</u> |
|---|

| Receiving a high-level syntax, wherein the high-level syntax comprises a first flag that indicates whether a residual coding scheme is switchable. <u>1312</u> |
|---|

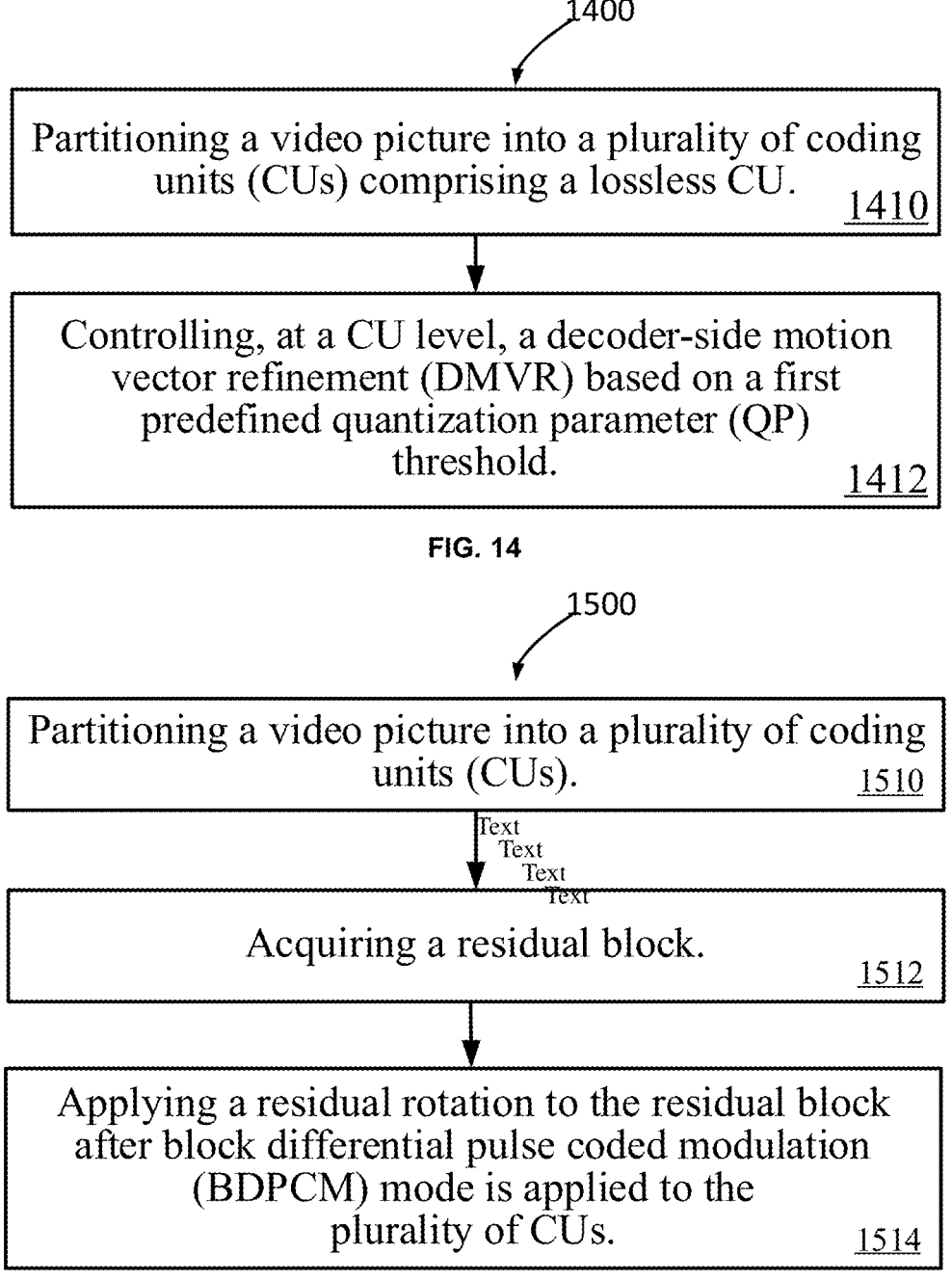

1400

Partitioning a video picture into a plurality of coding units (CUs) comprising a lossless CU. 1410

Controlling, at a CU level, a decoder-side motion vector refinement (DMVR) based on a first predefined quantization parameter (QP) threshold. 1412

Partitioning a video picture into a plurality of coding units (CUs). 1510

Acquiring a residual block. 1512

Applying a residual rotation to the residual block after block differential pulse coded modulation (BDPCM) mode is applied to the plurality of CUs. 1514

FIG. 15

METHODS AND DEVICES FOR LOSSLESS CODING MODES IN VIDEO CODING

CROSS-REFERENCE TO RELATED APPLICATIONS

This application is a continuation application of U.S. application Ser. No. 17/727,626, filed on Apr. 22, 2022, which is a continuation application of PCT Application No. PCT/US2020/057172, filed on Oct. 23, 2020, which is based upon and claims priority to Provisional Applications No. 62/925,216 filed on Oct. 23, 2019, and 62/946,414 filed on Dec. 10, 2019, the disclosures of which are incorporated herein by reference in their entireties for all purposes.

TECHNICAL FIELD

This disclosure is related to video coding and compression. More specifically, this disclosure relates to methods and apparatus for lossless coding in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for lossless coding in video coding.

According to a first aspect of the present disclosure, a method of lossless coding modes for decoding a video signal is provided. The method may include a decoder partitioning a video picture into a plurality of coding units (CUs) comprising a lossless CU. The decoder may also receive a high-level syntax. The high-level syntax may include a first flag that indicates whether a residual coding scheme is switchable.

According to a second aspect of the present disclosure, a computing device is provided. The computing device may include one or more processors, a non-transitory computer-readable memory storing instructions executable by the one or more processors. The one or more processors may be configured to partition a video picture into a plurality of CUs comprising a lossless CU. The one or more processors may also be configured to receive a high-level syntax. The high-level syntax may include a first flag that indicates whether a residual coding scheme is switchable.

According to a third aspect of the present disclosure, a non-transitory computer-readable storage medium having stored therein instructions is provided. When the instructions are executed by one or more processors of the apparatus, the instructions may cause the apparatus to obtain a plurality of CUs. The instructions may also cause the apparatus to partition a video picture into a plurality of CUs. The instructions may further cause the apparatus to acquire a residual block. The instructions may also cause the apparatus to apply a residual rotation to the residual block after BDPCM mode is applied to the plurality of CUs.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3A is a diagram illustrating block partitions in a multi-type tree structure, according to an example of the present disclosure.

FIG. 3B is a diagram illustrating block partitions in a multi-type tree structure, according to an example of the present disclosure.

FIG. 3C is a diagram illustrating block partitions in a multi-type tree structure, according to an example of the present disclosure.

FIG. 3D is a diagram illustrating block partitions in a multi-type tree structure, according to an example of the present disclosure.

FIG. 3E is a diagram illustrating block partitions in a multi-type tree structure, according to an example of the present disclosure.

FIG. 4 is a diagram illustration of a picture with 18 by 12 luma CTUs, according to an example of the present disclosure.

FIG. 10A is an n illustration of state transition, according to an example of the present disclosure.

FIG. 10B is an illustration of quantizer selection, according to an example of the present disclosure.

FIG. 11 is an illustration of a template used for selecting probability models, according to the present disclosure.

FIG. 14 is a method of lossless coding modes for video decoding, according to an example of the present disclosure.

FIG. 15 is a method of lossless coding modes for decoding a video signal, according to an example of the present disclosure.

DETAILED DESCRIPTION

Figure 1:
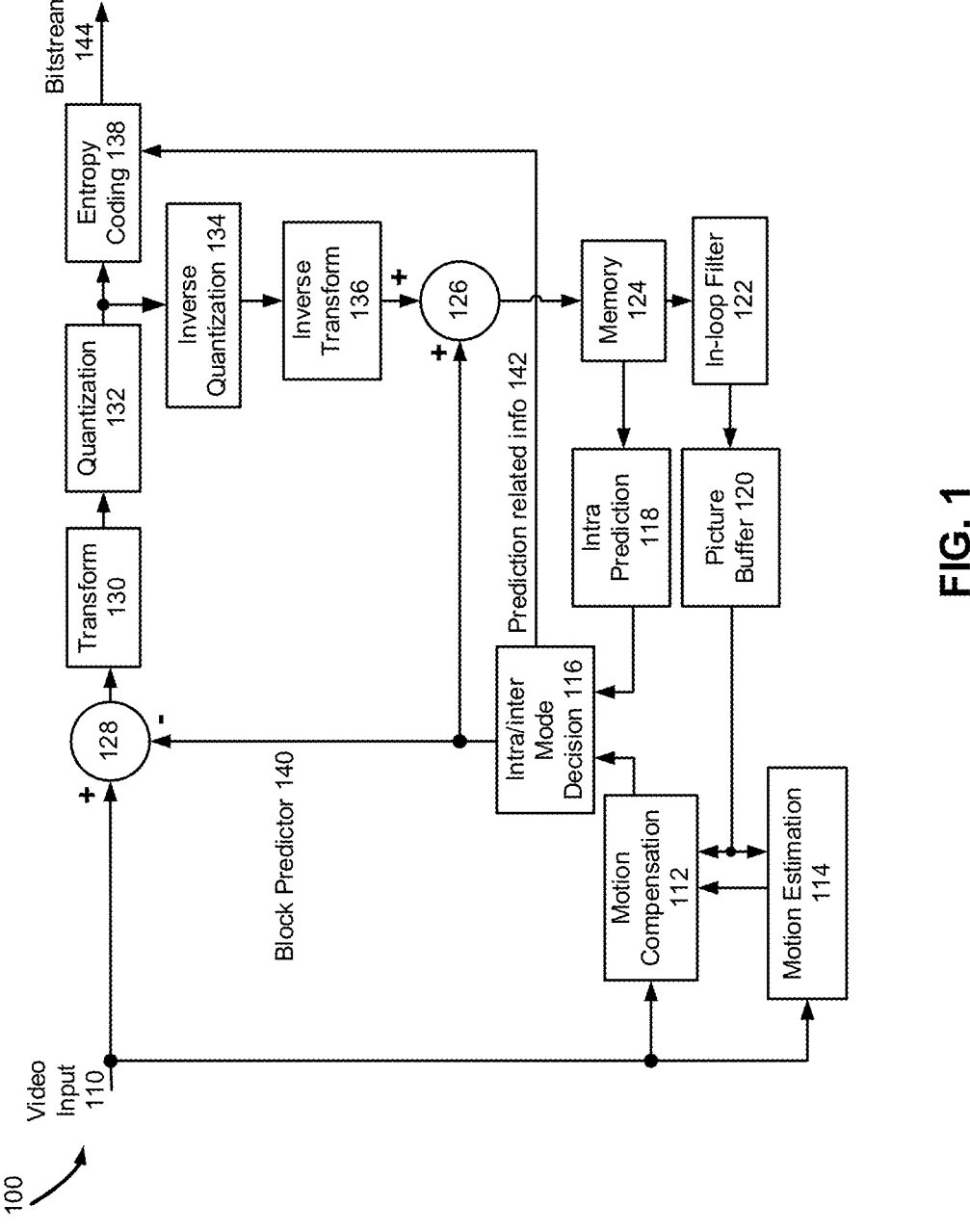
FIG. 1 is a block diagram of an encoder, according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block (CB) is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from. A CU, for example, may include one or more CBs.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. By definition, coding tree block (CTB) is an N×N block of samples for some value of N such that the division of a component into CTBs is a partitioning. CTU includes a CTB of luma samples, two corresponding CTBs of chroma samples of a picture that has three sample arrays, or a CTB of samples of a monochrome picture or a picture that is coded using three separate color planes and syntax structures used to code the samples. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bitstream, coding mode (inter or intra), prediction mode information, motion information, and quantized residual coefficients are all sent to the entropy coding unit to be further compressed and packed to form the bitstream.

Figure 2:
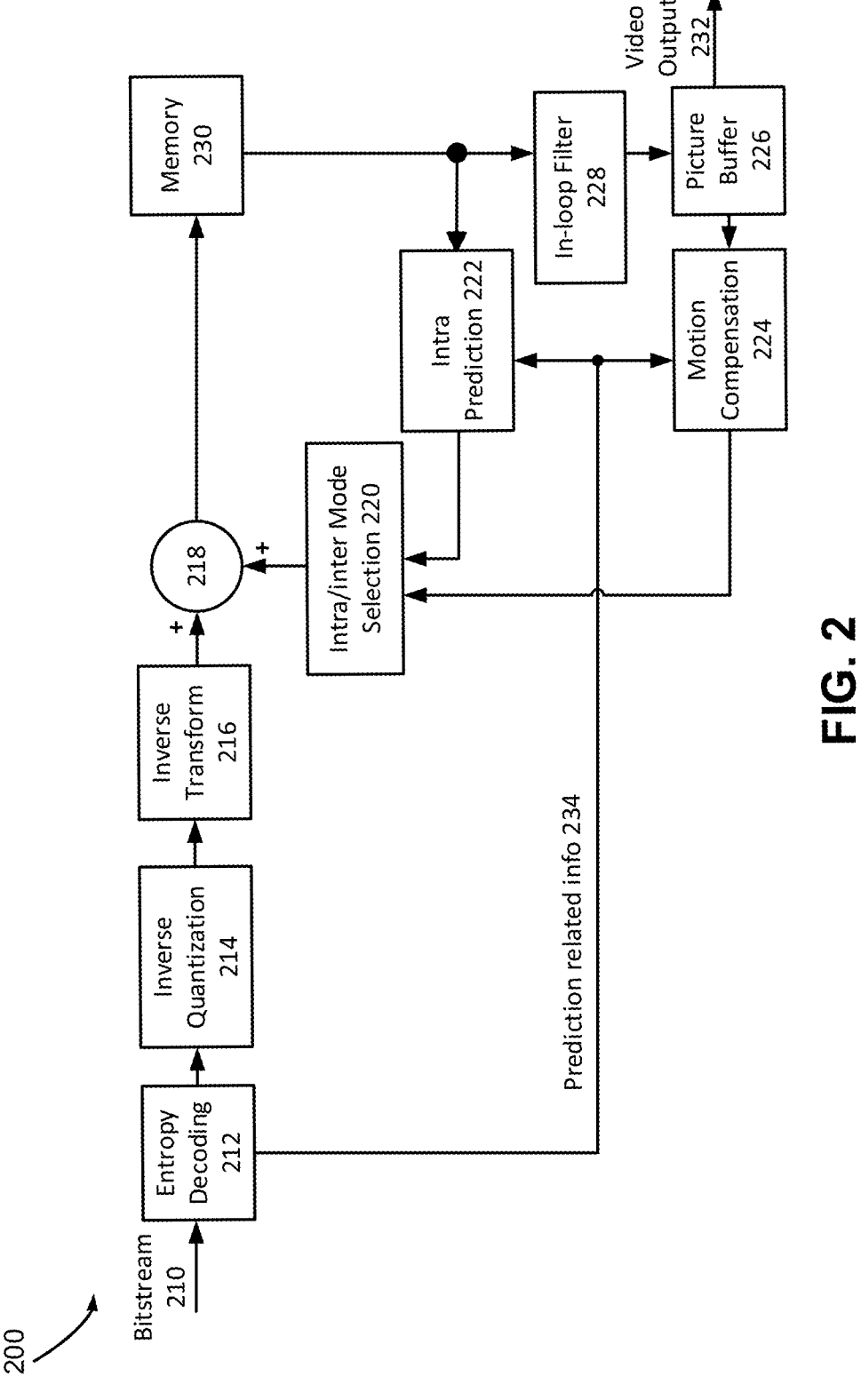
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation.

Partitioning of Pictures, Tile Groups, Tiles, and CTUs in VVC

In VVC, tile is defined as a rectangular region of CTUs within a particular tile column and a particular tile row in a picture. Tile group is a group of an integer number of tiles of a picture that are exclusively contained in a single NAL unit. Basically, the concept of tile group is the same as slice as defined in HEVC. For example, pictures are divided into tile groups and tiles. A tile is a sequence of CTUs that cover a rectangular region of a picture. A tile group contains a number of tiles of a picture. Two modes of tile groups are supported, namely the raster-scan tile group mode and the rectangular tile group mode. In the raster-scan tile group mode, a tile group contains a sequence of tiles in tile raster scan of a picture. In the rectangular tile group mode, a tile group contains a number of tiles of a picture that collectively form a rectangular region of the picture. The tiles within a rectangular tile group are in the order of tile raster scan of the tile group.

FIG. 4 shows an example of raster-scan tile group partitioning of a picture, where the picture is divided into 12 tiles and 3 raster-scan tile groups. FIG. 4 includes tiles 410, 412, 414, 416, and 418. Each tile has 18 CTUs. More specifically, FIG. 4 shows a picture with 18 by 12 luma CTUs that is partitioned into 12 tiles and 3 tile groups (informative). The three tile groups are as follows (1) the first tile group includes tiles 410 and 412, (2) the second tile group includes tiles 414, 416, 418, 420, and 422, and (3) the third tile group includes tiles 424, 426, 428, 430, and 432.

Figures 5, 6A, 6B, 6C, 6D, 6E, 6F, 6G, 6H:
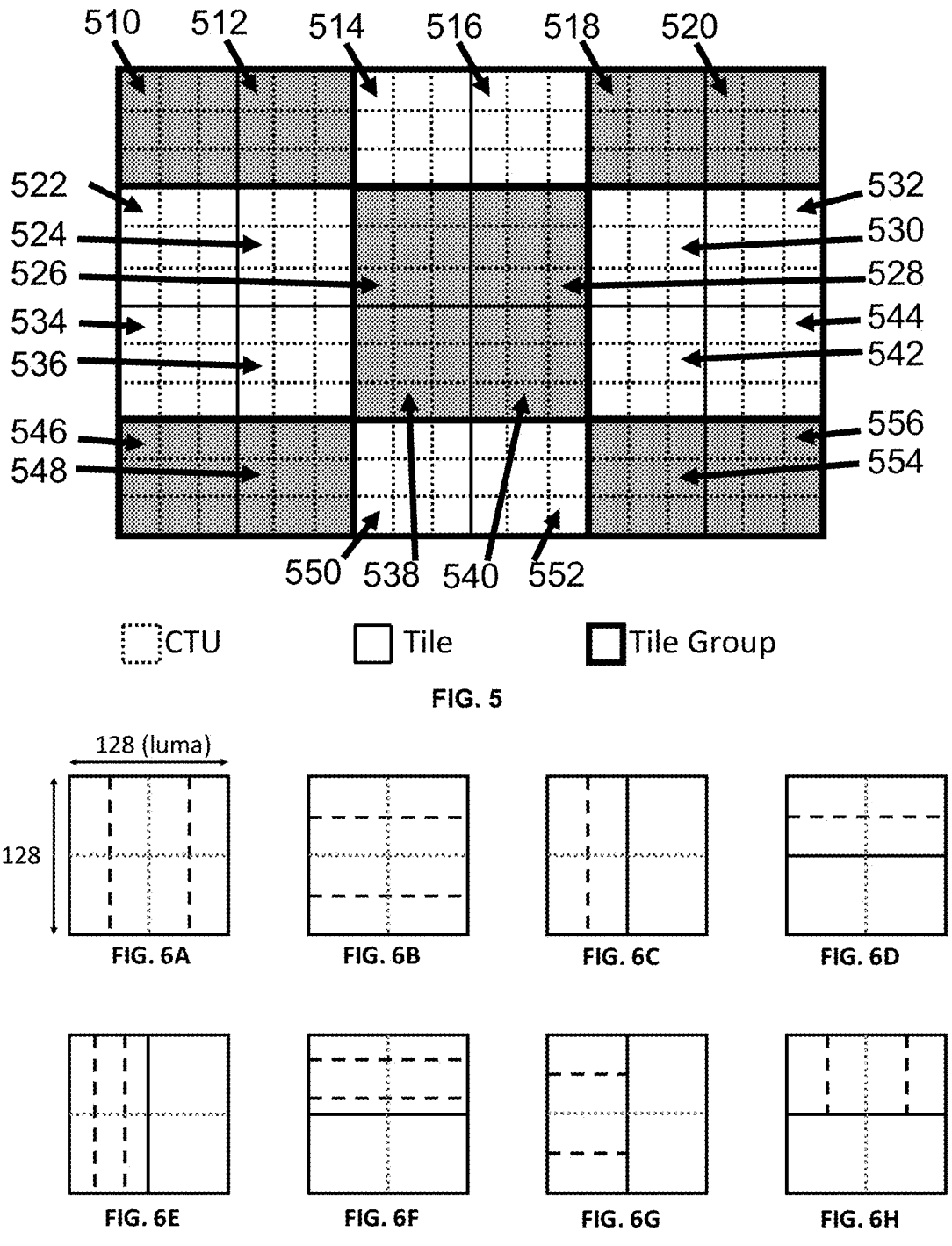
FIG. 5 is an illustration of a picture with 18 by 12 luma CTUs, according to an example of the present disclosure.
FIG. 6A is an illustration of an example of disallowed ternary tree (TT) and binary tree (BT) partitioning in VTM, according to an example of the present disclosure.
FIG. 6B is an illustration of an example of disallowed TT and BT partitioning in VTM, according to an example of the present disclosure.
FIG. 6C is an illustration of an example of disallowed TT and BT partitioning in VTM, according to an example of the present disclosure.
FIG. 6D is an illustration of an example of disallowed TT and BT partitioning in VTM, according to an example of the present disclosure.
FIG. 6E is an illustration of an example of disallowed TT and BT partitioning in VTM, according to an example of the present disclosure.
FIG. 6F is an illustration of an example of disallowed TT and BT partitioning in VTM, according to an example of the present disclosure.
FIG. 6G is an illustration of an example of disallowed TT and BT partitioning in VTM, according to an example of the present disclosure.
FIG. 6H is an illustration of an example of disallowed TT and BT partitioning in VTM, according to an example of the present disclosure.

FIG. 5 shows an example of rectangular tile group partitioning of a picture, where the picture is divided into 24 tiles (6 tile columns and 4 tile rows) and 9 rectangular tile groups. FIG. 5 includes tile 510, 512, 514, 516, 518, 520, 522, 524, 526, 528, 530, 532, 534, 536, 538, 540, 542, 544, 546, 548, 550, 552, 554, and 556. More specifically, FIG. 5 shows a picture with 18 by 12 luma CTUs that is partitioned into 24 tiles and 9 tile groups (informative). A tile group contains tiles and a tile contain CTUs. The 9 rectangular tile groups include (1) the two tiles 510 and 512, (2) the two 514 and 516, (3) the two tiles 518 and 520, (4) the four tiles 522, 524, 534, and 536, (5) the four tiles groups 526, 528, 538, and 540 (6) the four tiles 530, 532, 542, and 544, (7) the two tiles 546 and 548, (8) the two tiles 550 and 552, and (9) the two tiles 554 and 556.

Large Block-Size Transforms with High-Frequency Zeroing in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

Virtual Pipeline Data Units (VPDUs) in VVC

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5, as shown in FIGS. 6A, 6B, 6C, 6D, 6E, 6F, 6G, and 6H (described below):

TT split is not allowed for a CU with either width or height, or both width and height equal to 128.

For a 12×N CU with N≤64 (i.e. width equal to 128 and height smaller than 128), horizontal BT is not allowed.

For an N×128 CU with N≤64 (i.e. height equal to 128 and width smaller than 128), vertical BT is not allowed.

FIGS. 6A, 6B, 6C, 6D, 6E, 6F, 6G, and 6H show examples of disallowed TT and BT partitioning in VTM.

Transform Coefficient Coding in VVC

Transform coefficient coding in VVC is similar to HEVC in the sense that they both use non-overlapped coefficient groups (also called CGs or subblocks). However, there are also some differences between them. In HEVC, each CG of coefficients has a fixed size of 4×4. In VVC Draft 6, the CG size becomes dependent on TB size. As a consequence, various CG sizes (1×16, 2×8, 8×2, 2×4, 4×2 and 16×1) are available in VVC. The CGs inside a coding block, and the transform coefficients within a CG, are coded according to pre-defined scan orders.

In order to restrict the maximum number of context coded bins per pixel, the area of the TB and the type of video component (e.g. luma component vs. chroma component) are used to derive the maximum number of context-coded bins (CCB) for a TB. The maximum number of context-coded bins is equal to TB_zosize*1.75. Here, TB_zosize indicates the number of samples within a TB after coefficient zero-out. Note that the coded_sub_block_flag, which is a flag indicating if a CG contains non-zero coefficient or not, is not considered for CCB count.

Coefficient zero-out is an operation performed on a transform block to force coefficients located in a certain region of the transform block to be 0. For example, in the current VVC, a 64×64 transform has an associated zero-out operation. As a result, transform coefficients located outside the top-left 32×32 region inside a 64×64 transform block are all forced to be 0. In fact, in the current VVC, for any transform block with a size over 32 along a certain dimension, coefficient zero-out operation is performed along that dimension to force coefficients located beyond the top-left 32×32 region to be 0.

Figure 7:
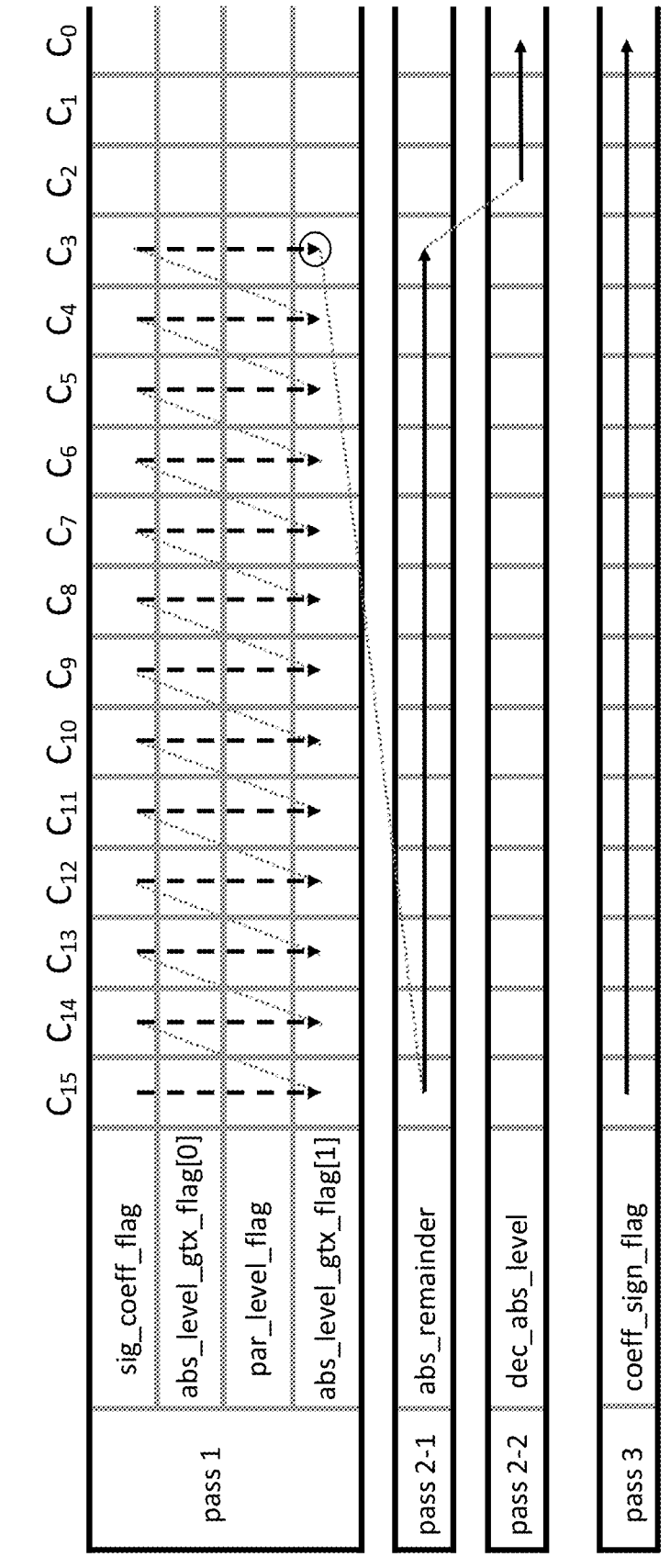
FIG. 7 is an illustration of a residual coding structure for transform blocks, according to an example of the present disclosure.

In transform coefficient coding in VVC, a variable, rem-BinsPass1, is first set to the maximum number of context-coded bins (MCCB) allowed. In the coding process, the variable is decreased by one each time when a context-coded bin is signaled. While the remBinsPass1 is larger than or equal to four, a coefficient is firstly signaled through syntaxes of sig_coeff_flag, abs_level_gt1_flag, par_level_flag, and abs_level_gt3_flag, all using context-coded bins in the first pass. The rest part of level information of the coefficient is coded with syntax element of abs_remainder using Golomb-rice code and bypass-coded bins in the second pass. When the remBinsPass1 becomes smaller than 4 while coding the first pass, a current coefficient is not coded in the first pass, but directly coded in the second pass with the syntax element of dec_abs_level using Golomb-Rice code and bypass-coded bins. After all the above-mentioned level coding, the signs (sign_flag) for all scan positions with sig_coeff_flag equal to 1 is finally coded as bypass bins. Such a process is depicted in FIG. 7 (described below). The remBinsPass1 is reset for every TB. The transition of using context-coded bins for the sig_coeff_flag, abs_level_gt1_flag, par_level_flag, and abs_level_gt3_flag to using bypass-coded bins for the rest coefficients only happens at most once per TB. For a coefficient subblock, if the remBinsPass1 is smaller than 4 before coding its very first coefficient, the entire coefficient subblock is coded using bypass-coded bins.

FIG. 7 shows an illustration of residual coding structure for transform blocks.

The unified (same) rice parameter (ricePar) derivation is used for signaling the syntax of abs_remainder and dec_abs_level. The only difference is that baseLevel is set to 4 and 0 for coding abs_remainder and dec_abs_level, respectively. Rice parameter is determined based on not only the sum of absolute levels of neighboring five transform coefficients in local template, but also the corresponding base level as follows:

$$RicePara = RiceParTable\left[\max\left(\min\left(31, sumAbs - 5 * baseLevel\right), 0\right)\right]$$

Residual Coding for Transform Skip Mode in VVC

Unlike HEVC where a single residual coding scheme is designed for coding both transform coefficients and transform skip coefficients, in VVC two separate residual coding schemes are employed for transform coefficients and transform skip coefficients (i.e. residual), respectively.

In transform skip mode, the statistical characteristics of residual signal are different from those of transform coefficients, and no energy compaction around low-frequency components is observed. The residual coding is modified to account for the different signal characteristics of the (spatial) transform skip residual which includes:

no signaling of the last x/y position;
coded_sub_block_flag coded for every subblock except for the DC subblock when all previous flags are equal to 0;

sig_coeff_flag context modelling with two neighboring coefficients;
par_level_flag using only one context model;
additional greater than 5, 7, 9 flags;
modified rice parameter derivation for the remainder binarization;
context modeling for the sign flag is determined based on left and above neighboring coefficient values and sign flag is parsed after sig_coeff_flag to keep all context coded bins together.

Figure 8:
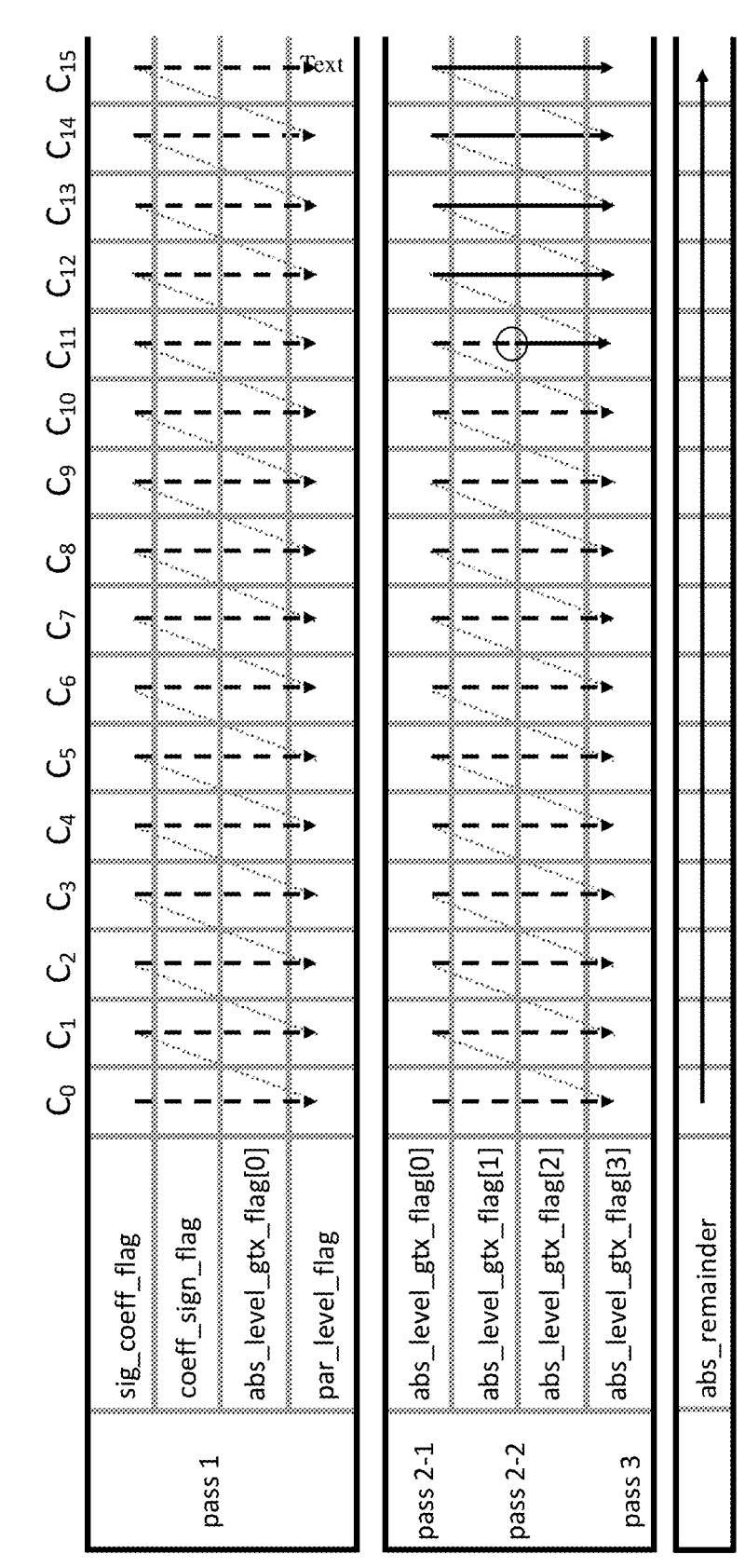
FIG. 8 is an illustration of a residual coding structure for transform skip blocks, according to an example of the present disclosure.

As shown in FIG. 8 (described below), syntax elements sig_coeff_flag, coeff_sign_flag, abs_level_gt1_flag, par_level_flag, are coded in an interleaved manner residual sample by residual sample in the first pass, followed by abs_level_gtX_flag bitplanes in the second pass, and abs_remainder coding in the third pass.

Pass 1: sig_coeff_flag, coeff_sign_flag, abs_level_gt1_flag, par_level_flag.
Pass 2: abs_level_g3_flag, abs_level_gt5_flag, abs_level_gt7_flag, abs_level_gt9_flag.
Pass 3: abs_remainder FIG. 8 shows an illustration of residual coding structure for transform skip blocks.

Quantization

In current VVC, Maximum QP value was extended from 51 to 63, and the signaling of initial QP was changed accordingly. The initial value of SliceQpY can be modified at the slice segment layer when a non-zero value of slice_qp_delta is coded. For transform skip block, minimum allowed Quantization Parameter (QP) is defined as 4 because quantization step size becomes 1 when QP is equal to 4.

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 9:
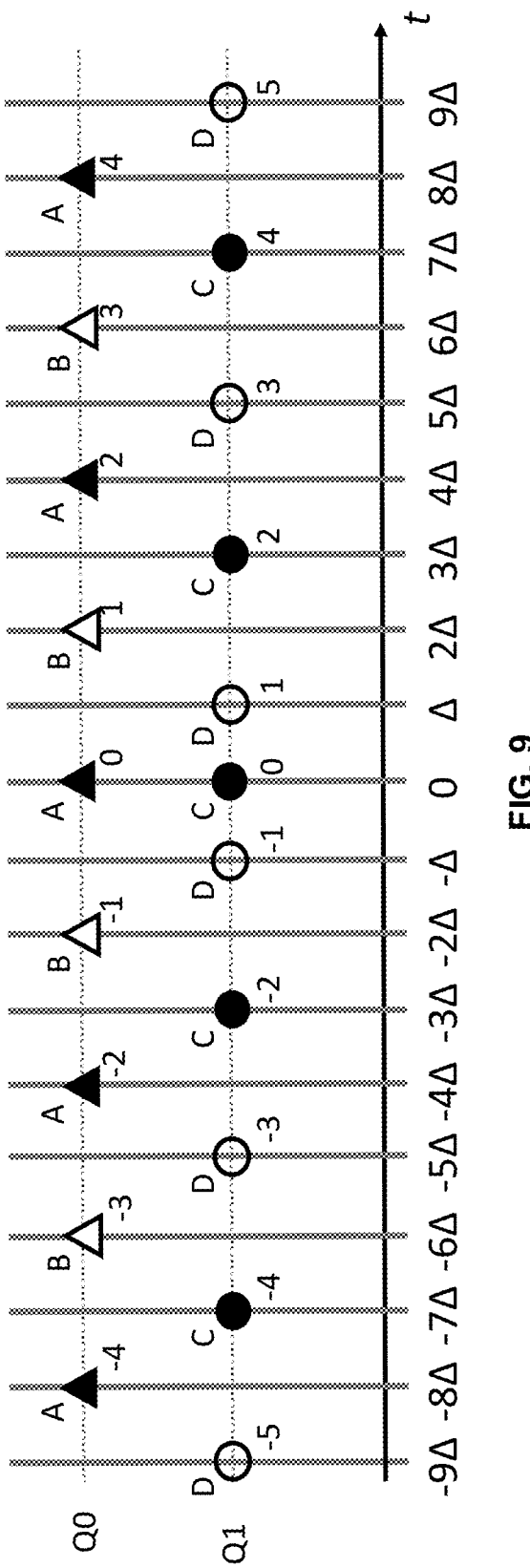
FIG. 9 is an illustration of two scalar quantizers, according to an example of the present disclosure.

The two scalar quantizers used, denoted by Q0 and Q1, are illustrated in FIG. 9 (described below). The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

FIG. 9 shows an illustration of the two scalar quantizers used in the proposed approach of dependent quantization.

As illustrated in FIGS. 10A and 10B (described below), the switching between the two scalar quantizers (Q0 and Q1) is realized via a state machine with four quantizer states (QState). The QState can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 10, where k denotes the value of the transform coefficient level.

FIG. 10A shows a transition diagram illustrating a state transition for the proposed dependent quantization.

FIG. 10B shows a table illustrating a quantizer selection for the proposed dependent quantization.

It is also supported to signal the default and user-defined scaling matrices. The DEFAULT mode scaling matrices are all flat, with elements equal to 16 for all TB sizes. IBC and intra coding modes currently share the same scaling matrices. Thus, for the case of USER_DEFINED matrices, the number of MatrixType and MatrixType_DC are updated as follows:

$$MatrixType: 30 = 2 \left(2 \text{ for intra } \& IBC/\text{inter}\right) \times 3 \left(Y/Cb/Cr \text{ components}\right) \times$$

$$5 \left(\text{square } TB \text{ size: from } 4 \times 4 \text{ to } 64 \times 64 \text{ for luma,}\right.$$

$$\left.\text{from } 2 \times 2 \text{ to } 32 \times 32 \text{ for chroma}\right).$$

$$MatrixType\_DC: 14 = 2 \left(2 \text{ for intra } \& IBC/\text{inter} \times 1 \text{ for Y component}\right) \times$$

$$3 \left(TB \text{ size: } 16 \times 16, 32 \times 32, 64 \times 64\right) + 4 \left(2 \text{ for intra } \& IBC/\text{inter} \times\right.$$

$$\left.2 \text{ for } Cb/Cr \text{ components}\right) \times 2 \left(TB \text{ size: } 16 \times 16, 32 \times 32\right).$$

The DC values are separately coded for following scaling matrices: 16×16, 32×32, and 64×64. For TBs of size smaller than 8×8, all elements in one scaling matrix are signaled. If the TBs have size greater than or equal to 8×8, only 64 elements in one 8×8 scaling matrix are signaled as a base scaling matrix. For obtaining square matrices of size greater than 8×8, the 8×8 base scaling matrix is up-sampled (by duplication of elements) to the corresponding square size (i.e. 16×16, 32×32, 64×64). When the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero. Moreover, the number of elements signaled for the 64×64 scaling matrix is also reduced from 8×8 to three 4×4 submatrices, since the bottom-right 4×4 elements are never used.

Context Modeling for Transform Coefficient Coding

The selection of probability models for the syntax elements related to absolute values of transform coefficient levels depends on the values of the absolute levels or partially reconstructed absolute levels in a local neighbourhood. The template used is illustrated in FIG. 11.

FIG. 11 shows an illustration of the template used for selecting probability models. The black square specifies the current scan position and the squares with an "x" represent the local neighbourhood used.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

numSig: the number of non-zero levels in the local neighbourhood;

sumAbs1: the sum of partially reconstructed absolute levels (absLevel1) after the first pass in the local neighbourhood;

sumAbs: the sum of reconstructed absolute levels in the local neighbourhood diagonal position (d): the sum of the horizontal and vertical coordinates of a current scan position inside the transform block Based on the values of numSig, sumAbs1, and d, the probability models for coding sig_coeff_flag, abs_level_gt1_flag, par_level_flag, and abs_level_gt3_flag are selected. The Rice parameter for binarizing abs_remainder and dec_abs_level is selected based on the values of sumAbs and numSig.

In current VVC, reduced 32-point MTS (also called RMTS32) is based on skipping high frequency coefficients and used to reduce computational complexity of 32-point DST-7/DCT-8. And, it accompanies coefficient coding changes including all types of zero-out (i.e., RMTS32 and the existing zero out for high frequency components in DCT2). Specifically, binarization of last non-zero coefficient position coding is coded based on reduced TU size, and the context model selection for the last non-zero coefficient position coding is determined by the original TU size. In addition, 60 context models are used to code the sig_coef_f_flag of transform coefficients. The selection of context model index is based on a sum of a maximum of five previously partially reconstructed absolute level called locSumAbsPass1 and the state of dependent quantization QState as follows:

If cIdx is equal to 0, ctxInc is derived as follows:

$$ctxInc = 12 * \text{Max} \left(0, QState - 1\right) +$$

$$\text{Min} \left(\left(locSumAbsPass1 + 1\right) >> 1, 3\right) + \left(d < 2 ? 8: \left(d < 5 ? 4: 0\right)\right)$$

Otherwise (cIdx is greater than 0), ctxInc is derived as follows:

$$ctxInc = 36 + 8 * \text{Max} \left(0, QState - 1\right) +$$

$$\text{Min} \left(\left(locSumAbsPass1 + 1\right) >> 1, 3\right) + \left(d < 2 ? 4: 0\right)$$

Decoder-Side Motion Vector Refinement (DMVR) in VVC

Figures 12, 13:
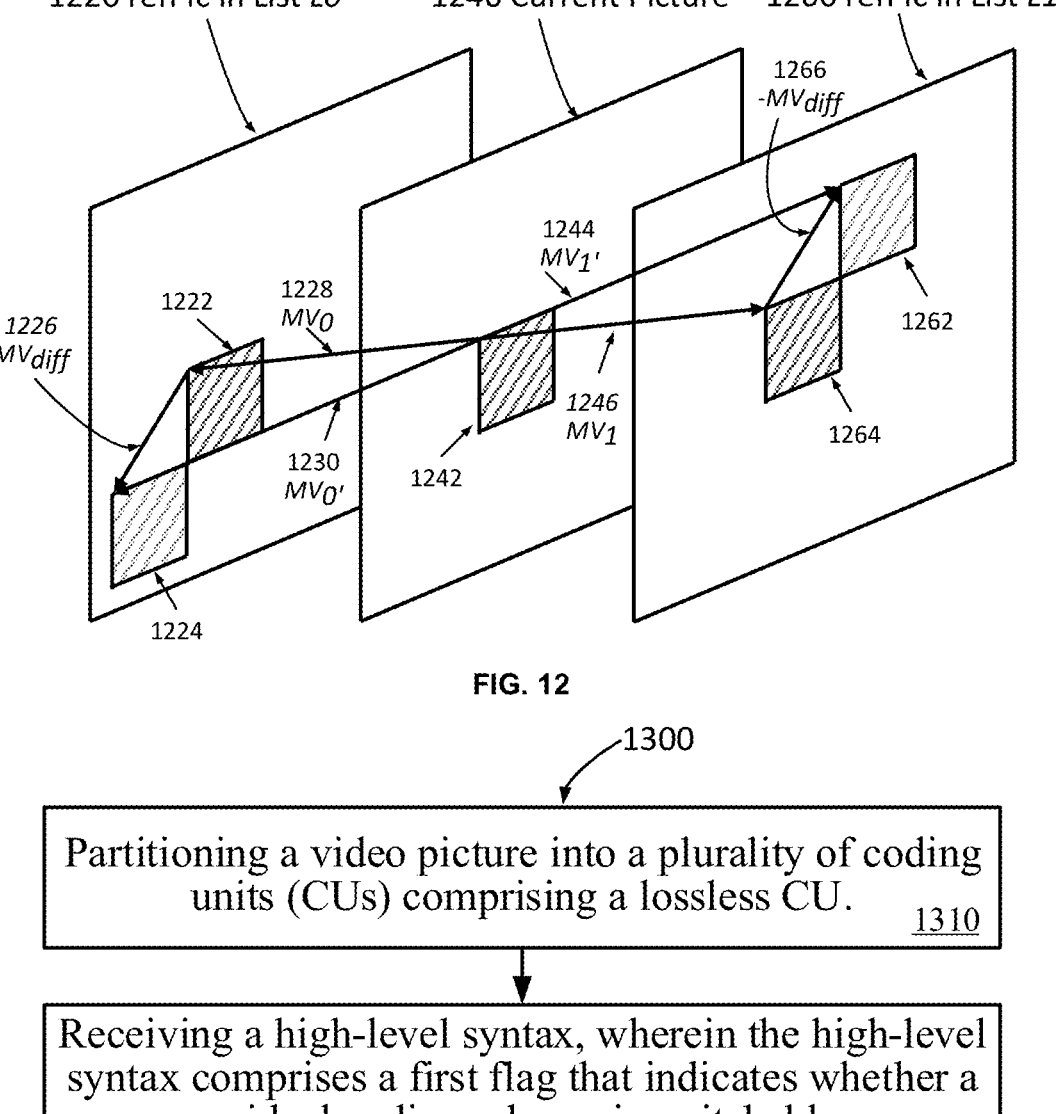
FIG. 12 is an illustration of a decoding side motion vector refinement, according to the present disclosure.
FIG. 13 is a method of lossless coding modes for decoding a video signal, according to an example of the present disclosure.

Decoder-side Motion Vector Refinement (DMVR) is a technique for blocks coded in bi-prediction Merge mode and controlled by a SPS level flag sps_dmvr_enabled_flag. Under this mode, the two motion vectors (MV) of a block can be further refined using bilateral matching (BM) prediction. As shown in the FIG. 12 (described below), the bilateral matching method is used to refine motion information of a current CU by searching the closest match between its two reference blocks along the motion trajectory of the current CU in its two associated reference pictures. In this FIG. 12, the patterned black rectangular blocks (1222 and 1264) indicate the current CU and its two reference blocks based on the initial motion information from Merge mode. The patterned rectangular blocks (1222 and 1264) indicate one pair of reference blocks based on a MV candidate used in the motion refinement research process. The MV differences between the MV candidate and the initial MV (also called original MV) are $MV_{diff}$ and $-MV_{diff}$ respectively, as indicated in FIG. 12. During DMVR, a number of such MV candidates around the initial MV may be checked. Specifically, for each given MV candidate, its two associated reference blocks may be located from its reference pictures in List 0 and List 1 respectively, and the difference between them is calculated. Such block difference is usually measured in SAD (or sum of absolute difference), or row-subsampled SAD (i.e. the SAD calculated with every other row of the block involved). At the end, the MV candidate with the lowest SAD between its two reference blocks becomes the refined MV and used to generate the bi-predicted signal as the actual prediction for the current CU.

FIG. 12 shows a decoding side motion vector refinement.

FIG. 12 includes 1220 refPic in list L0, 1240 current picture, and 1260 refPic in list L1. 1220 refPic in list L0 is a reference picture of the first list and includes 1222 current CU, 1224 reference block, 1226 MVdiff, 1228 MV0, and 1230 MV0'. 1226 MVdiff is the motion vector difference between 1222 current CU and 1224 reference block. 1228 MV0 is the motion vector between blocks 1222 current CU and 1242 current CU. 1230 MV0' is the motion vector between blocks 1222 current CU and 1242 current CU. 1240 current picture is a current picture of the video and includes 1242 current CU, 1244 MV1', and 1246 MV1. 1244 MV1' is the motion vector between block 1242 current CU and 1262 reference block. 1246 MV1 is the motion vector between blocks 1242 current CU and 1264 current CU. 1260 refPic in List L1 is a reference picture in the second list and includes 1262 reference block, 1264 current CU, and 1266 −MVdiff. 1266 −MVdiff is the motion vector difference between 1262 reference block and 1264 current CU.

In VVC, the DMVR is applied to a CU that satisfies the following conditions:

Coded with CU level merge mode (not subblock merge mode) with bi-prediction MV;

With respect to the current picture, one reference picture of the CU is in the past (i.e. with a POC smaller than the current picture POC) and another reference picture is in the future (i.e. with a POC greater than the current picture POC);

The POC distances (i.e. absolute POC difference) from both reference pictures to the current picture are the same;

CU has more than 64 luma samples in size and the CU height is more than 8 luma samples The refined MV derived by DMVR process is used to generate the inter prediction samples and also used in temporal motion vector prediction for future picture coding. While the original MV is used in deblocking process and also in spatial motion vector prediction for future CU coding.

Bi-directional Optical Flow (BDOF) in VVC

The bi-directional optical flow (BDOF) tool is included starting from VTM5. BDOF, previously referred to as BIO, was included in the JEM. Compared to the JEM version, the BDOF in VTM5 is a simpler version that requires much less computation, especially in terms of number of multiplications and the size of the multiplier. BDOF is controlling by a SPS flag sps_bdof_enabled_flag.

BDOF is used to refine the bi-prediction signal of a CU at the 4×4 sub-block level. BDOF is applied to a CU if it satisfies the following conditions: 1) the CU's height is not 4, and the CU is not in size of 4×8, 2) the CU is not coded using affine mode or the ATMVP merge mode; 3) the CU is coded using "true" bi-prediction mode, i.e., one of the two reference pictures is prior to the current picture in display order and the other is after the current picture in display order. BDOF is only applied to the luma component.

As its name indicates, the BDOF mode is based on the optical flow concept, which assumes that the motion of an object is smooth. The BDOF adjusts the prediction sample value Decoder-Side Controlling for DMVR and BDOF in VVC In current VVC, BDOF/DMVR are always applied if its corresponding SPS control flag is enabled and some bi-prediction and size constrains are met for a regular merge candidate.

DMVR is applied to a regular merge mode when all the following conditions are true:

sps_dmvr_enabled_flag is equal to 1 and slice_disable_b-dof_dmvr_flag is equal to 0.

general_merge_flag[xCb][yCb] is equal to 1;

both predFlagL0[0][0] and predFlagL1[0][0] are equal to 1;

mmvd_merge_flag[xCb][yCb] is equal to 0;

DiffPicOrderCnt(currPic, RefPicList[0][refIdxL0]) is equal to DiffPicOrderCnt(RefPicList[1][refIdxL1], currPic);

BcwIdx[xCb][yCb] is equal to 0;

Both luma_weight_l0_flag[refIdxL0] and luma_weight_l1_flag[refIdxL1] are equal to 0;

cbWidth is greater than or equal to 8;

cbHeight is greater than or equal to 8;

cbHeight*cbWidth is greater than or equal to 128;

For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively. For example, when X is 0, the pic_width_in_luma_samples and pic_height_in_luma_samples of the reference picture refPicL0 associated with the refIdxL0 are equal to the pic_width_in_luma_samples and pic_height_in_luma_samples of the current picture, X is respectively. When X is 1, pic_width_in_luma_samples and pic_height_in_luma_samples of the reference picture refPicL1 associated with the refIdxL1 are equal to the pic_width_in_luma_samples and pic_height_in_luma_samples of the current picture, respectively.

BDOF is applied to bi-prediction when all the following conditions are true:

sps_bdof_enabled_flag is equal to 1 and slice_disable_b-dof_dmvr_flag is equal to 0;

predFlagL0[xSbIdx][ySbIdx] and predFlagL1[xSbIdx][ySbIdx] are both equal to 1;

DiffPicOrderCnt (currPic, RefPicList[0][refIdxL0])*DiffPicOrderCnt(currPic, RefPicList[1][refIdxL1]) is less than 0;

MotionModelIdc[xCb][yCb] is equal to 0;

merge_subblock_flag[xCb][yCb] is equal to 0;

sym_mvd_flag[xCb][yCb] is equal to 0;

ciip_flag[xCb][yCb] is equal to 0;

BcwIdx[xCb][yCb] is equal to 0;

luma_weight_l0_flag[refIdxL0] and luma_weight_l1_flag [refIdxL1] are both equal to 0;

cbWidth is greater than or equal to 8;

cbHeight is greater than or equal to 8;

cbHeight*cbWidth is greater than or equal to 128;

For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively;

cIdx is equal to 0.

Block Differential Pulse Coded Modulation

The VVC supports block differential pulse coded modulation (BDPCM) for residual coding. At the sequence level, one BDPCM enabling/disabling flag is signaled. When BDPCM is enabled, a flag is transmitted for intra CUs with both width and height smaller than or equal to MaxTsSize by MaxTsSize, where MaxTsSize is the maximum block size that allows transform skip mode to be applied. When the flag is equal to one, one BDPCM prediction direction flag is transmitted to indicate whether the intra prediction direction is horizontal or vertical. After the intra prediction, the residual is then quantized and the difference between each quantized residual and its predictor, i.e. the previously coded residual of the horizontal/vertical (depending on the BDPCM prediction direction) neighboring position, is coded.

For a block of size M (height)×N (width), let $t_{i,j}$, $0 \le i \le M-1$, $0 \le j \le N-1$ be the prediction residual. Let $Q(r_{i,j})$, $0 \le i \le M-1$, $0 \le j \le N-1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for $0 \le j \le (N-1)$, the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \le i \le (M-1) \end{cases} \quad (1)$$

For horizontal BDPCM prediction mode, for $0 \le i \le (M-1)$, the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \le j \le (N-1) \end{cases} \quad (2)$$

At the decoder side, the above process is reversed to compute $Q(r_{i,j})$, $0 \le i \le M-1$, $0 \le j \le N-1$, as follows:

$$Q(r_{i,j}) = \sum_{k=0}^{i} \tilde{r}_{k,j}, \text{ if vertical } BDPCM \text{ is used} \quad (3)$$

$$Q(r_{i,j}) = \sum_{k=0}^{j} \tilde{r}_{k,j}, \text{ if horizontal } BDPCM \text{ is used} \quad (4)$$

The inverse quantized residuals, $Q^{-1}(Q(r_{i,j}))$, are added to the intra block prediction values to produce the reconstructed sample values.

The predicted quantized residual values $\tilde{r}_{i,j}$ are sent to decoder using the same residual coding process as that in transform skip mode residual coding. In terms of the MPM mode for future intra mode coding, horizontal or vertical prediction mode is stored for a BDPCM-coded CU if the BDPCM prediction direction is horizontal or vertical, respectively. For deblocking, if both blocks on the sides of a block boundary are coded using BDPCM, then that particular block boundary is not deblocked.

Picture Header

In current VVC, the picture header is proposed to be transmitted once per coded picture and contains information that is common for all slices of the coded picture associated with the picture header.

Lossless Coding in HEVC

The lossless coding mode in HEVC is achieved by simply bypassing transform, quantization, and in-loop filters (deblocking filter, sample adaptive offset, and adaptive loop filter). The design is aimed to enable the lossless coding with minimum changes required to the regular HEVC encoder and decoder implementation for mainstream applications.

In HEVC the lossless coding mode can be turned on or off at the individual CU level. This is done through a syntax cu_transquant_bypass_flag signaled at CU level. In order to reduce signaling overhead where lossless coding mode is unnecessary, the cu_transquant_bypass_flag syntax is not always signaled. It is signaled only when another syntax called transquant_bypass_enabled_flag has a value of 1. In other words, the syntax transquant_bypass_enabled_flag is used to turn on the syntax signaling of cu_transquant_bypass_flag.

In HEVC, the syntax transquant_bypass_enabled_flag is signaled in the picture parameter set (PPS) to indicate whether the syntax cu_transquant_bypass_flag needs to be signaled for every CU inside a picture referring to the PPS. If this flag is set equal to 1, the syntax cu_transquant_bypass_flag is sent at the CU level to signal whether the current CU is coded with the lossless mode or not. If this flag is set equal to 0 in the PPS, cu_transquant_bypass_flag is not sent, and all the CUs in the picture are encoded with transform, quantization, and loop filters involved in the process, which will generally result in a certain level of video quality degradation. To code an entire picture losslessly, one has to set the flag transquant_bypass_enabled_flag in the PPS to 1 and set the CU-level flag cu_transquant_bypass_flag equal to 1 for every CU in the picture. The detailed syntax signaling related to the lossless mode in HEVC is illustrated below.

transquant_bypass_enabled_flag equal to 1 specifies that cu_transquant_bypass_flag is present. transquant_bypass_enabled_flag equal to 0 specifies that cu_transquant_bypass_flag is not present.

cu_transquant_bypass_flag equal to 1 specifies that the scaling and transform process as specified in clause 8.6 and the in-loop filter process as specified in clause 8.7 are bypassed. When cu_transquant_bypass_flag is not present, it is inferred to be equal to 0.

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   transquant_bypass_enabled_flag | u(1) |
|   ... | |
| } | |

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   ... | |
| } | |

| | Descriptor |
|---|---|
| transform_unit( x0, y0, xBase, yBase, log2TrafoSize, trafoDepth, blkIdx ) { | |

17
-continued

| | Descriptor |
|---|---|
| ... | |
| if( cbfChroma && !cu_transquant_bypass_flag ) | ae(v) |
|   chroma_qp_offset( ) | |
|   ... | |
| } | |

| | Descriptor |
|---|---|
|   residual_coding( x0, y0, log2TrafoSize, cIdx ) { | |
|   if( transform_skip_enabled_flag && | |
|   !cu_transquant_bypass_flag && | |
|   ( log2TrafoSize <= Log2MaxTransformSkipSize ) ) | |
|     transform_skip_flag[ x0 ][ y0 ][ cIdx ] | ae(v) |
|   ... | |
|   if( cu_transquant_bypass_flag \| \| ( CuPredMode | |
|   [ x0 ][ y0 ] = = MODE_INTRA && | |
|   implicit_rdpcm_enabled_flag && | |
|   transform_skip_flag[ x0 ][ y0 ][ cIdx ] && | |
|   ( predModeIntra = = 10 \| \| | |
|   predModeIntra = = 26 ) ) \| \| | |
|   explicit_rdpcm_flag[ x0 ][ y0 ][ cIdx ] ) | |
|     signHidden = 0 | |
|     ... | |
|   } | |

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may be understood to mean "when" or "upon" or "in response to" depending on the context.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

Inefficiencies of Lossless Coding Modes in Video Coding

In VVC, the maximum TU size is 64×64 and the VPDU is also set as 64×64. The maximum block size for coefficients coding in VVC is 32×32 because of the coefficient zero-out mechanism for width/height greater than 32. Under this constraint, current transform skip only supports up to 32×32 TU so that the maximum block size for residual coding can be aligned with the maximum block size for coefficient coding which is 32×32. However, in VVC, there is no constraint for the block size of residual coding for a lossless CU. As a result, currently in VVC it is possible to generate a residual block under lossless coding mode with a size greater than 32×32, which would require the support of residual coding for blocks greater than 32×32. This is not preferred for the codec implementation. In this disclosure, several methods are proposed to address this inefficiency.

Another inefficiency associated with lossless coding support in VVC is how to choose the residual (or referred as coefficient) coding scheme. In the current VVC two different residual coding schemes are available. For a given block (or CU), the selection of residual coding scheme is based on the transform skip flag of a given block (or CU). Therefore, if under lossless mode in VVC the transform skip flag is assumed to be 1 as in HEVC, the residual coding scheme used under transform skip mode would always be used for a lossless mode CU. However, the current residual coding scheme used when the transform skip flag is true is designed mainly for screen content coding. It may not be optimal to be used for lossless coding of regular content (i.e. non-screen content). In this disclosure, several methods are proposed to select the residual coding for lossless coding mode.

A third inefficiency associated with lossless coding in the current VVC is that the selection of context model in transform coefficient coding is dependent on the scalar quantizer used. However, as the quantization process is disabled in lossless coding, it may not be optimal to select the context model according to the quantizer selection if the transform coefficient coding is applied for coding the residual block under lossless coding mode.

A fourth inefficiency is related to the maximum context CCB for each TU under lossless coding mode. For luma and chroma TU, current limitation under lossy coding mode is TB_zosize*1.75. It may not be optimal for lossless coding.

A fifth inefficiency is related to the coding of sign flag of transform coefficients. Currently the sign flag is signaled as context-coded bin in residual coding for transform skip block, and as bypass coded bin in transform coefficient coding. This is because in transform coefficient coding, it is assumed that the sign of transform coefficients has almost equal probability of taking a value of 0 versus 1, and it is not so correlated with its neighboring transform coefficient values. However, in the residual coding for transform skip mode, the sign of residual does show correlation with neighboring residual values. As a result, if the transform coefficient coding is applied to code the residual block, it can be expected that the sign of residual is also very likely to be correlated with neighboring residual values. In this case, coding them as bypass bins may not be optimal.

In current VVC, two decoder-side search tools, i.e., BDOF and DMVR, are used to refine decoded pixel values to improve coding performance. However, in lossless coding, since the prediction pixels are already in very high fidelity, the BDOF and DMVR do not bring much coding gain benefit. Hence, the BDOF and DMVR should not be applied in lossless coding because theses decoder-side tools are quite complex for decoder. However, in current VVC, BDOF and DMVR are always applied if its corresponding SPS enabling flag is enabled and some bi-prediction and size constrains are met for a regular merge candidate. For lossless VVC coding, it is beneficial to have some lower-level control of DMVR and BDOF enabling, e.g. at slice level and/or CU level.

Proposed Methods for Improving Lossless Coding Modes in Video Coding

In this disclosure, several methods are proposed to address the inefficiencies mentioned in the section of Inefficiencies of Lossless Coding Modes in Video Coding. It is noted that the following methods could be applied independently or jointly.

Residual Block Partition for Lossless CU

According to one or more embodiments of the disclosure, it is proposed to align the maximum residual coding block size for a lossless CU with the maximum block size supported by transform skip mode.

In one example, the transform skip mode can only be enabled for a residual block whose width and height are both smaller than or equal to 32, which means the maximum residual coding block size under transform skip mode is 32×2. Here, the maximum width and/or height of the residual block for a lossless CU is also set to be 32, with a maximum residual block size as 32×32. Whenever the width/height of a lossless CU is greater than 32, the CU residual block is divided into multiple smaller residual blocks with a size of 32×N and/or N×32 so that the width or height of the smaller residual blocks are not greater than 32. For example, a 128×32 lossless CU is divided into four 32×32 residual blocks for residual coding. In another example, a 64×64 lossless CU is divided into four 32×32 residual blocks.

According to one or more embodiments of the disclosure, it is proposed to align the maximum block size for residual coding for a lossless CU with the size of VPDU. In one example, the width/height of maximum residual block for lossless CU is set to the VPDU size (e.g. 64×64 in current VVC). Whenever the width/height of a lossless CU is greater than 64, the CU residual block is divided into multiple smaller residual blocks with a size of 64×N and/or N×64 so that the width or height of the smaller residual blocks are not greater than VPDU width and/or height. For example, a 128×128 lossless CU is divided into four 64×64 residual blocks for residual coding. In another example, a 128×32 lossless CU is divided into two 64×32 residual blocks.

Selection of Residual Coding Scheme for a Lossless Mode CU

In current VVC, different residual coding schemes are utilized by a CU depending on if the CU is coded with the transform skip mode. The current residual coding used under transform skip mode is generally more suitable for screen content coding.

In one or more embodiments, a lossless CU may use the same residual coding scheme as the one used by the transform skip mode CUS.

In one or more embodiments, a lossless CU may use the same residual coding scheme as the one used by the non-transform skip mode CUs.

According to one or more embodiments, the residual coding scheme for lossless CUs is selected adaptively from the existing residual coding schemes based on certain conditions and/or predefined procedures. Such conditions and/or predefined procedures are followed by both the encoder and decoder, so that there is no signaling needed in the bitstream to indicate the selection. In one example, a simple screen content detection scheme may be specified and utilized in both encoder and decoder. Based on the detection scheme, a current video block may be classified as screen content or regular content. In case it is screen content, the residual coding scheme used under transform skip mode is selected. Otherwise, the other residual coding scheme is selected.

According to one or more embodiments, a syntax is signaled in the bitstream to explicitly specify which residual coding scheme is used by a lossless CU. Such a syntax may be a binary flag, with each binary value indicating the selection of one of the two residual coding schemes. The syntax can be signaled at different levels. For example, it may be signaled in an sequence parameter set (SPS), picture level (e.g., picture parameter set (PPS), picture header), slice header, tiles group header, or tile. It may also be signaled at CTU or CU level. When such a syntax is signaled, all the lossless CUs at the same or lower level would use the same residual coding scheme indicated by the syntax. For example, when the syntax is signaled at SPS level, all the lossless CUs in the sequence would use the same residual coding scheme indicated. When the syntax is signaled at picture level, all the lossless CUs in a picture would use the same residual coding scheme indicated in the associated picture level syntax. In case there is a syntax at CU level to indicate if a CU is coded in lossless mode, such as the cu_transquant_bypass_flag, the syntax indicating residual coding scheme is conditionally signaled based on the lossless mode flag of the CU. For example, only when the lossless mode flag cu_transquant_bypass_flag indicates that the current CU is coded in lossless mode, the syntax indicating residual coding scheme is signaled for the CU. For another example, it may be signaled in TU level. In case there is a syntax at CU level to indicate if a CU is coded in lossless mode, such as the cu_transquant_bypass_flag, a syntax for each TU of current lossless CU is signaled to indicate the selection of one of the two residual coding schemes.

According to one or more embodiments, even for a lossless mode coded CU, a transform skip mode flag is signaled. In this case, regardless of a CU being coded in lossless mode or not, the selection of residual coding scheme for the CU is based on its transform skip mode flag.

According to one or more embodiments, a high-level syntax is signaled in the bitstream to specify if the residual coding scheme is switchable; if the residual coding is switchable, additional low-level syntax, e.g. at CU level, is also signaled to specify which residual coding scheme is used by a lossless CU. In one example, a high-level (e.g., SPS, picture level/header, slice header, tiles group header, or tile) syntax is signaled to indicate if the residual coding scheme can be selected. If such a high-level syntax is set equal to 0, the residual coding used by the non-transform skip mode (i.e. the transform coefficient coding scheme) is always applied for lossless block. If such a high-level is set equal to 1, additional low-level (e.g., coding unit, transform block) syntax is signaled to indicate which residual coding is used for lossless block.

FIG. 13 shows a method of lossless coding modes for decoding a video signal in accordance with the present disclosure. The method may be, for example, applied to a decoder.

In step 1310, the decoder may partition a video picture into a plurality of CUs comprising a lossless CU.

In step 1312, the decoder may receive a high-level syntax. The high-level syntax may include, for example, a first flag that indicates whether a residual coding scheme is switchable.

Disabling DMVR

In current VVC, the controlling of DMVR on/off is not defined for lossless coding mode. In one or more embodiments, it is proposed to control turn on/off DMVR in slice level by a 1-bit signaling slice_disable_dmvr_flag flag. In one example, the slice_disable_dmvr_flag flag is needed to be signaled if sps_dmvr_enabled_flag is set equal to 1 and transquant_bypass_enabled_flag flag is set equal to 0. If slice_disable_dmvr_flag flag is not signaled, it is inferred to be 1. If slice_disable_dmvr_flag is equal to 1, DMVR is turned off. In this case, the signaling is as followed:

```
if( sps_dmvr_enabled_flag && !transquant_bypass_enabled_flag)
    slice_disable_dmvr_flag                                    u(1)
```

In one or more embodiments, it is proposed to control turning on/off DMVR in CU level by certain conditions and/or predefined procedures. In one example, the cu level controlling for DMVR is as the following:

DMVR is applied to a regular merge mode when determining that all the following conditions are true:
sps_dmvr_enabled_flag is equal to 1 and slice_disable_b-dof_dmvr_flag is equal to 0;
cu_transquant_bypass_flag is set equal to 0;
general_merge_flag[xCb][yCb] is equal to 1;
both predFlagL0[0][0] and predFlagL1[0][0] are equal to 1;
mmvd_merge_flag[xCb][yCb] is equal to 0;
ciip_flag[xCb][yCb] is equal to 0;
DiffPicOrderCnt(currPic, RefPicList[0][refIdxL0]) is equal to
DiffPicOrderCnt(RefPicList[1][refIdxL1], currPic);
BcwIdx[xCb][yCb] is equal to 0;
Both luma_weight_10_flag[refIdxL0] and luma_weight_11_flag [refIdxL1] are equal to 0; cbWidth is greater than or equal to 8;
cbHeight is greater than or equal to 8;
cbHeight*cbWidth is greater than or equal to 128;
For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively In another example, the cu level controlling for DMVR is dependent on a predefined QP threshold (QP_THR) as the following:

DMVR is applied to a regular merge mode when determining that all the following conditions are true:
sps_dmvr_enabled_flag is equal to 1 and slice_disable_b-dof_dmvr_flag is equal to 0;
Qp is greater than QP_THR;
general_merge_flag[xCb][yCb] is equal to 1;
both predFlagL0[0][0] and predFlagL1[0][0] are equal to 1;
mmvd_merge_flag [xCb][yCb] is equal to 0;
ciip_flag[xCb][yCb] is equal to 0;
DiffPicOrderCnt(currPic, RefPicList[0][refIdxL0]) is equal to DiffPicOrderCnt(RefPicList[1][refIdxL1], currPic);
BcwIdx[xCb][yCb] is equal to 0;
Both luma_weight_10_flag[refIdxL0] and luma_weight_11_flag[refIdxL1] are equal to 0;
cbWidth is greater than or equal to 8;
cbHeight is greater than or equal to 8; cbHeight*cbWidth is greater than or equal to 128;
For X being each of 0 and 1, the pic_width_in_luma_samples and pic_height_in_luma_samples of the reference picture refPicLX associated with the refIdxLX are equal to the pic_width_in_luma_samples and pic_ height_in_luma_samples of the current picture, respectively. For example, when X is 0, the pic_width_in_luma_samples and pic_height_in_luma_samples of the reference picture refPicL0 associated with the refIdxL0 are equal to the pic_width_in_luma_samples and pic_height_in_luma_samples of the current picture, respectively. When X is 1, the pic_width_in_luma_samples and pic_height_in_luma_samples of the reference picture refPicL1 associated with the refIdxL1 are equal to the pic_width_in_luma_samples and pic_height_in_luma_samples of the current picture, respectively.

FIG. 14 shows a method of lossless coding modes for video decoding. The method may be, for example, applied to a decoder.

In step 1410, the decoder may partition a video picture into a plurality of CUs comprising a lossless CU.

In step 1412, the decoder may control, at a CU level, a DMVR based on a first predefined QP threshold.

Disabling BDOF

In current VVC, the controlling of BDOF on/off is not defined for lossless coding mode. In one or more embodiments, it is proposed to control turn on/off BDOF by a 1-bit signaling slice_disable_bdof_flag flag. In one example, the slice_disable_bdof_flag flag is signaled if sps_bdof_enabled_flag is set equal to 1 or transquant_bypass_enabled_flag flag is set equal to 0. If slice_disable_bdof_flag flag is not signaled, it is inferred to be 1. If slice_disable_bdof_flag flag is equal to 1, BDOF is disable. In this case, the signaling is illustrated as follows:

```
if( sps_bdof_enabled_flag && !transquant_bypass_enabled_flag)
    slice_disable_bdof_flag                                    u(1)
```

In one or more embodiments, it is proposed to control turning on/off BDOF in cu level by certain conditions and/or predefined procedures. In one example, the cu level controlling for BDOF is as the following:

BDOF is applied to a regular merge mode when determining that all the following conditions are true:
sps_bdof_enabled_flag is equal to 1 and slice_disable_b-dof_dmvr_flag is equal to 0;
cu_transquant_bypass_flag is set equal to 0;
predFlagL0[xSbIdx][ySbIdx] and predFlagL1[xSbIdx][ySbIdx] are both equal to 1;
DiffPicOrderCnt(currPic,RefPicList[0][refIdxL0])*DiffPicOrderCnt (currPic,
RefPicList[1][refIdxL1]) is less than 0;
MotionModelIdc [xCb] [yCb] is equal to 0;
merge_subblock_flag[xCb][yCb] is equal to 0;
sym_mvd_flag[xCb][yCb] is equal to 0;
ciip_flag[xCb][yCb] is equal to 0;
BcwIdx[xCb][yCb] is equal to 0;
luma_weight_10_flag[refIdxL0] and luma_weight_11_flag[refIdxL1] are both equal to 0;
cbWidth is greater than or equal to 8;
cbHeight is greater than or equal to 8;
cbHeight*cbWidth is greater than or equal to 28;
For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively;
cIdx is equal to 0.

In another example, the cu level controlling for BDOF is dependent on a predefined QP threshold (QP_THR) as the following:

BDOF is applied to a regular merge mode when determining that all the following conditions are true:

sps_bdof_enabled_flag is equal to 1 and slice_disable_bdof_dmvr_flag is equal to 0;

Qp is greater than QP_THR;

predFlagL0[xSbIdx][ySbIdx] and predFlagL1[xSbIdx][ySbIdx] are both equal to 1;

DiffPicOrderCnt(currPic, RefPicList[0][refIdxL0])*DiffPicOrderCnt(currPic, RefPicList[1][refIdxL1]) is less than 0;

MotionModelIdc[xCb][yCb] is equal to 0;

merge_subblock_flag[xCb][yCb] is equal to 0;

sym_mvd_flag[xCb][yCb] is equal to 0;

ciip_flag [xCb][yCb] is equal to 0;

BcwIdx [xCb][yCb] is equal to 0;

luma_weight_l0_flag[refIdxL0] and luma_weight_l1_flag[refIdxL1] are both equal to 0;

cbWidth is greater than or equal to 8;

cbHeight is greater than or equal to 8;

cbHeight*cbWidth is greater than or equal to 128;

For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively;

cIdx is equal to 0.

Disabling BDOF and DMVR jointly

In current VVC, both of BDOF and DMVR are always applied for decoder-side refinement to improve coding efficiency and controlled by each SPS flag and condition of some bi-prediction and size constrains are met for a regular merge candidate. In one or more embodiments, it is proposed to disable both BDOF and DMVR by a 1-bit slice_disable_bdof_dmvr_flag slice flag. If the slice_disable_bdof_dmvr_flag flag is set equal to 1, both BDOF and DMVR are turned off. If slice_disable_bdof_dmvr_flag flag is not signaled, it is inferred to be 1. In one example, slice_disable_bdof_dmvr_flag is signaled if the following condition is met.

```
if( (sps_bdof_enabled_flag || sps_dmvr_enabled_flag) &&
    !transquant_bypass_enabled_flag )
        slice_disable_bdof dmvr_flag                    u(1)
```

Selection of Context Model for Residual Coding in Lossless VVC

As previously stated in section "Context modelling for coefficient coding," the selection of context model for signaling "sig_coeff_flags" depends on the quantizer state (QState) and a sum of a maximum of five previously partially reconstructed absolute level called locSumAbsPass1. As shown in FIG. 10, QState is switched among 4 states (state 0, state 1, state 2, and state 3) after coding each transform coefficients according to the scalar quantizer selection (Q0 and Q1) and the parity bit of k, which is the previous quantization level in reconstruction order. At the start of the inverse quantization for a transform block, the state is set equal to 0. However, since the scalar quantization is disabled for lossless coding, it may not be optimal to still select the context model according to the quantizer state.

In one or more embodiments, it is proposed to select context model independently from the scalar quantizer state.

In one example, a constant QState value is always used in selecting the context model for coding residual block if the transform coefficient coding scheme is applied for coding the residual block under lossless coding. Such a constant QState value may be chosen as 0. In other examples, such a constant QState value may be chosen as a non-zero value as well, e.g. 1, 2 or 3.

In still another example, a constant QState value is always used in selecting the context model for coding a residual block if the transform coefficient coding scheme is applied for coding the residual block under lossless coding. However, a different QState constant value may be used in selecting the context model when coding a different block, or a different slice, or a different frame, etc. under lossless coding.

Maximum Number of Context-Coded Bins

In current VVC, the maximum number of the context-coded bins for luma and chroma are set to be TB_zosize*1.75. In one or more embodiments, it is proposed to remove the limitation on the maximum number of CCB on TB for lossless coding.

In one or more embodiments, it is proposed to set maximum number of context-coded bin of luma and chroma to be a value larger than TB_zosize*1.75 for lossless coding. In one example, the maximum number of context-coded bin of luma and chroma is set as TB_zosize*4 for lossless coding. In another example, the maximum number of context-coded bin of luma and chroma is set as TB_zosize*8 for lossless coding.

Sign Flag Coding in Residual Coding for Lossless Coding Mode

In current VVC, the sign flag of each transform coefficient with sig_coeff_flag equal to 1 is coded as bypass bin as previously illustrated in the section of "Transform coefficient coding in VVC." It is asserted that because of the absence of transform module in lossless coding, the sign of residual is strongly correlated with the sign of its neighboring residuals. Therefore, if the transform coefficient coding scheme is applied for lossless coding to code the residual block, coding the sign flag with context model may be beneficial for coding efficiency.

In one or more embodiments, in lossless coding, it is proposed to signal the sign flag as context-coded bin using the transform coefficient coding scheme. In one example, a new context model may be designed and added for coding the sign flag if the transform coefficient coding scheme is applied in lossless coding to code the residual block. In one case, such a new context model may be designed and operated in the same way as the context model used for sign flag coding in the residual coding for transform skip mode. In another example, an existing context model may be shared and used. In one case, the current context model for sign flag coding in the residual coding for transform skip mode may be shared and used for coding the sign flag when the transform coefficient coding is applied in lossless coding to code residual block.

In current VVC, the sign flag of residual in transform skip block is signal with context-coded bin. In one or more embodiments, it is proposed to code the sign flag of residual in transform skip block as bypass bin under lossless coding mode.

Rotating Residual Blocks

In current VVC, it is asserted that the prediction potentially causes larger amplitude residues at the bottom right area of the block because of the distance between the reconstructed pixels that are used for prediction and the predicted pixels. Therefore, rotating the residual blocks (i.e.

flipping the blocks along both horizontal and vertical direction) would place the potentially large amplitude residue at the top left area of the TU, which may be beneficial for residual coding and contribute coding gain. However, it is also asserted that rotating residual blocks may only provide coding gain in some blocks.

In one or more embodiments, it is proposed to adaptively rotate residual block based on certain conditions and/or predefined procedures. Such conditions and/or predefined procedures are followed by both the encoder and decoder, so that there is no signaling needed in the bitstream to indicate the selection. In one example, the residual blocks may be rotated only if its width or height is less than one predefined threshold. In another example, the residual blocks may be rotated only if its width and height are equal. In still another example, the residual blocks may be rotated only if its width and height are not equal. In one more example, the residual block may be rotated for certain video components, i.e., luma component or chroma component.

In another embodiment, it is proposed to determine whether to rotate the residuals of one coding block in one dimension (e.g., horizontal or vertical) based on the decision that whether the corresponding size of the dimension fulfills the predefined threshold. For instance, for coding blocks whose width is equal to or less than the predefined threshold while its height is larger than the threshold, the residuals of the block may be rotated only in the horizontal direction (i.e., horizontal flip). For coding blocks whose height is equal to or less than the threshold while its width is larger than the threshold, the residuals of the block may be rotated only in vertical direction (i.e., vertical flip). When both the width and height of one coding block are equal to or less than the threshold, the residuals of the coding block may be rotated in both horizontal and vertical directions. Otherwise, i.e., both its width and its height are larger than the threshold, no rotation is applied to the residuals of the block.

In one or more embodiments, it is proposed to rotate residual block according to the prediction mode. In one example, the residual blocks may be rotated only if its prediction mode is intra or intra block copy mode. In another example, the residual blocks may be rotated only if its prediction mode is intra or inter mode.

In another embodiment, it is proposed to signal one bit for each coding block to indicate whether to rotate its residuals. To save signaling overhead, additional signaling constraint may be applied to decide whether the residual rotation flag needs to be signaled or not. For instance, in one embodiment of the disclosure, it is proposed to only enable the residual rotation for coding block which contains N or less than N samples, where N is a predefined value. Then, for coding blocks which contain more than N samples, the residual rotation flag is not signaled and always inferred to be 0 (i.e., without residual rotation). Otherwise, for coding blocks which contain N or less than N samples, the flag is signaled to indicate whether the residuals need to be rotated or not.

In one or more embodiments, syntax is signaled in the bitstream to explicitly specify if a residual block is rotated for a TU. Such a syntax may be a binary flag. The syntax can be signaled at different levels. For example, it may be signaled in sequence parameter set (SPS), picture level (e.g., parameter set (PPS), picture header), slice header, tiles group header, or tile. It may also be signaled at CTU, CU, or TU level. When such a syntax is signaled, for all the TUs at the same or lower level, residual rotation would be performed according to the indication of the syntax value. In one example, the syntax is signaled at SPS level, residual rotation decision is shared among all the residual blocks of TUs in the sequence. In another example, the syntax is signaled at picture level, residual rotation decision is shared among all the residual block of TUs in a picture using that picture level syntax. In yet another example, the syntax is signaled at TU level, so each TU has its own decision about whether residual rotation should be performed.

In one or more embodiments, it is proposed to apply residual rotation after BDPCM is applied for a coding block. For example, in lossless coding where transform is not used, BDPCM may be applied to the prediction residual first, followed by prediction residual rotation. Such rotated prediction residual is then coded using transform coefficient coding scheme. Basically, it is found that in such case BDPCM operation does not change the prediction error distribution characteristics. Therefore, applying residual rotation after BDPCM still helps the residual coding engine to improve the coding efficiency.

In one or more embodiments, it is proposed to apply residual rotation only for non-BDPCM block. For example, if one coding block is applied with BDPCM mode, this coding block is not applied with residual rotation; otherwise, this coding block is applied with residual rotation.

FIG. 15 shows a method of lossless coding modes for decoding a video signal. The method may be, for example, applied to a decoder.

In step 1510, the decoder may partition a video picture into a plurality of CUs.

In step 1512, the decoder may acquire a residual block.

In step 1514, the decoder may apply a residual rotation to the residual block after BDPCM mode is applied to the plurality of CUs.

Scanning Order of Residual Block

In current VVC, both the residual coding used for transform skip mode and the transform coefficient coding scheme can be applied to code the residual blocks under lossless mode. If the residual coding designed for transform skip mode is applied, it codes the residual block samples based on the scan order from top-left of the block to bottom-right of the block. If the transform coefficient coding scheme is applied, it codes the residual block samples based on the exactly reversed scan order from bottom-right of the block to top-left of the block. In one or more embodiments, it is proposed to align the scanning order of both coding schemes under lossless coding. In one example, if the transform coefficient coding scheme is applied for lossless coding, the scanning and coding order of samples is the same as that used for residual coding under transform skip mode, i.e. starting from the top-left of the block to bottom-right of the block. Such a method is found beneficial to coding performance, because statistically energy distribution is biased toward the bottom-right portion of the residual block when it is coded under lossless coding mode due to the fact that sample prediction is less accurate in the bottom-right area and there is no transform performed.

Selection of Context Model for Signaling the Position of Last Non-Zero Coefficient In section "Context Modeling of transform coefficient coding," binarization of last non-zero coefficient position coding is based on reduced TU size (i.e. the TU size after coefficient zero-out operation) while the context model selection for the last non-zero coefficient position coding is determined by the original TU size. Therefore, the context model selection and the binarization for last non-zero coefficient position depend on different control logics. In one or more embodiments, it is proposed to select the context model for coding the position of last non-zero coefficient based on the reduced TU size. In one example, for a 64×64TU whose reduced TU size is 32×32 due to coefficient zero-out, the context selection for signaling the position of its last non-zero coefficient is based on its reduced TU size of 32×32 instead of the original size of 64×64. It also means that it shares the context with actual 32×32 TUs which do not have coefficient zero-out operation performed.

Likewise, in the current VVC under certain cases a 32×32 TU may be zero-out to a reduced size of 16×16. In this case, according to the proposed method in this disclosure, the context selection for signaling the position of its last non-zero coefficient is based on its reduced TU size of 16×16, and it also shares the context with actual 16×16 TUs. In another example, the reduced TU size is min (TUWidth, 32)*min (TUHeight, 32) for the TUs where DCT-II transform, and min (TUWidth, 16)*min (TUHeight, 16) for the TUs where DCT-VIII and DST-VII are applied. In still another example, only the selection of context model for 64×N or N×64 TUs is based on the reduced TU size. One asserted benefit of the proposed method is to reduce the total number of contexts used for coding last non-zero coefficient, given that the original context models that were previously used for 64×N and N×64 TU sizes are completely removed. Joint Context Model for Signaling the Position of Last Non-Zero Coefficient In current VVC, for last non-zero coefficient position coding, the context models for x-dimension and y-dimension of the last non-zero coefficient position are separately designed. In other words, separate groups of context models are used for each dimension. Within each group, context model is selected based on the size of a current block along that dimension.

In one or more embodiment of the disclosure, it is proposed to share one group of context models for both x and y dimensions of the last non-zero coefficient position. For coding a given dimension of the last non-zero coefficient position, the context model is selected based on the actual size of a current block along that dimension, from the same group of context models.

In another embodiment of the disclosure, it is proposed to share one group of context models for both x and y dimensions of the last non-zero coefficient position. For coding a given dimension of the last non-zero coefficient position, the context model is selected based on the zero-out size of a current block along that dimension, from the same group of context models.

According to the methods in the above embodiments, the number of context models needed for coding the last non-zero coefficient position may be reduced by half, relative to the current VVC design.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 16:
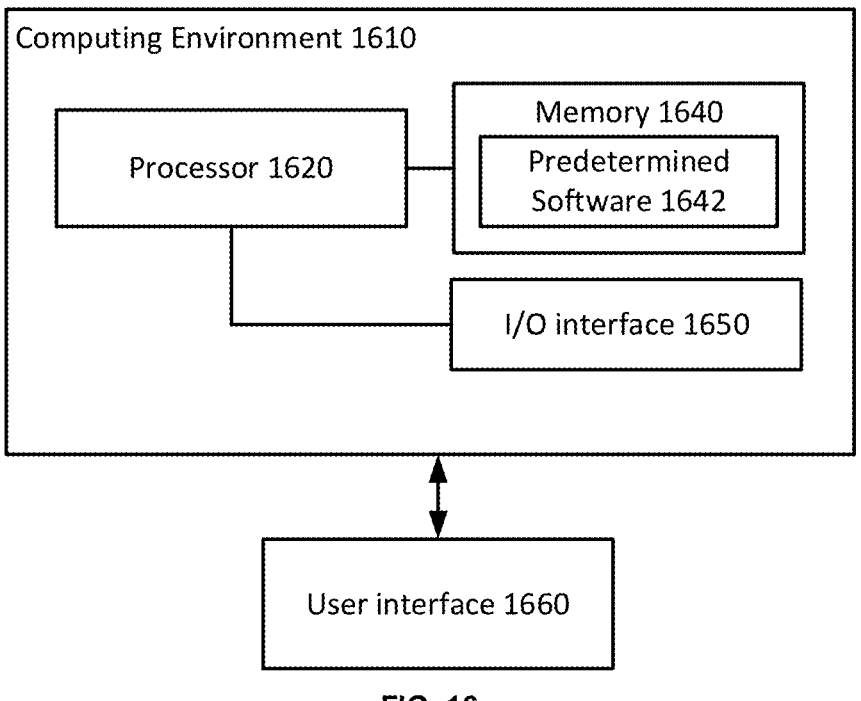
FIG. 16 is a diagram illustrating a computing environment coupled with a user interface, according to an example of the present disclosure.

FIG. 16 shows a computing environment 1610 coupled with a user interface 1660. The computing environment 1610 can be part of a data processing server. The computing environment 1610 includes processor 1620, memory 1640, and I/O interface 1650.

The processor 1620 typically controls overall operations of the computing environment 1610, such as the operations associated with the display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a GPU, or the like.

The memory 1640 is configured to store various types of data to support the operation of the computing environment 1610. Memory 1640 may include predetermine software 1642. Examples of such data include instructions for any applications or methods operated on the computing environment 1610, video datasets, image data, etc. The memory 1640 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1650 provides an interface between the processor 1620 and peripheral interface modules, such as a keyboard, a click wheel, buttons, and the like. The buttons may include but are not limited to, a home button, a start scan button, and a stop scan button. The I/O interface 1650 can be coupled with an encoder and decoder.

In some embodiments, there is also provided a non-transitory computer-readable storage medium comprising a plurality of programs, such as comprised in the memory 1640, executable by the processor 1620 in the computing environment 1610, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1610 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for encoding a video signal, comprising:

partitioning, by an encoder, a video picture into a plurality of coding units (CUs) comprising a lossless CU;

generating, by the encoder, a high-level syntax, wherein the high-level syntax comprises a first flag that indicates whether a residual coding scheme used by a CU in the CUs or by a coding block of a CU in the CUs is switchable between a residual coding scheme used by a non-transform skip mode and a residual coding scheme used by a transform skip mode; and signaling, by the encoder, the high-level syntax.

2. The method of claim 1, further comprising:

generating, by the encoder and when the residual coding scheme is switchable, a low-level syntax at CU level, wherein the low-level syntax comprises a residual coding scheme used by the lossless CU or a lossless coding block (CB); and signaling, by the encoder, the low-level syntax at CU level.

3. The method of claim 1, wherein the high-level syntax comprises a second flag that signals whether the residual coding scheme can be selected.

4. The method of claim 3, wherein the high-level syntax signals 0 to indicate that a residual coding scheme used by a non-transform skip mode is applied for the lossless CU or a lossless coding block (CB).

5. The method of claim 3, wherein the high-level syntax signals 1 to indicate that the residual coding scheme can be selected; and wherein the method further comprises:

generating, by the encoder, a low-level syntax to indicate which residual coding scheme is used for the lossless CU or a lossless coding block (CB);

signaling, by the encoder, the low-level syntax.

6. The method of claim 1, further comprising:

controlling, by the encoder and at a CU level, a decoder-side motion vector refinement (DMVR) based on a first predefined quantization parameter (QP) threshold.

7. The method of claim 6, further comprising:

controlling, by the encoder and at the CU level, a bi-directional optical flow (BDOF) based on a second predefined quantization parameter (QP) threshold.

8. The method of claim 1, further comprising:

acquiring, by the encoder, a residual block; and applying, by the encoder, a residual rotation to the residual block after block differential pulse coded modulation (BDPCM) mode is applied to the plurality of CUs.

9. The method of claim 8, wherein applying, at the encoder, the residual rotation to the residual block comprises:

applying, by the encoder and when a transform is not used, BDPCM mode to a prediction residual.

10. The method of claim 8, further comprising:

applying, by the encoder, residual rotation only to a non-BDPCM block.

11. A computing device, comprising:

one or more processors; and a non-transitory computer-readable storage medium storing instructions executable by the one or more processors, wherein the one or more processors are configured to:

partition a video picture into a plurality of coding units (CUs) comprising a lossless CU;

generate a high-level syntax, wherein the high-level syntax comprises a first flag that indicates whether a residual coding scheme used by a CU in the CUs or by a coding block of a CU in the CUs is switchable between a residual coding scheme used by a non-transform skip mode and a residual coding scheme used by a transform skip mode; and signal the high-level syntax.

12. The computing device of claim 11, wherein the one or more processors are further configured to:

generate, when the residual coding scheme is switchable, a low-level syntax at CU level, wherein the low-level syntax comprises a residual coding scheme used by the lossless CU or a lossless coding block (CB); and signal the low-level syntax at CU level.

13. The computing device of claim 11, wherein the high-level syntax comprises a second flag that signals whether the residual coding scheme can be selected.

14. The computing device of claim 13, wherein the high-level syntax signals 0 to indicate that a residual coding scheme used by a non-transform skip mode is applied for the lossless CU or a lossless coding block (CB).

15. The computing device of claim 13, wherein the high-level syntax signal 1 to indicate that the residual coding scheme can be selected; and wherein the one or more processors are further configured to:

generate a low-level syntax to indicate which residual coding scheme is used for the lossless CU or a lossless coding block (CB); and signal the low-level syntax.

16. A method for storing a bitstream, comprising:

performing an encoding method to generate the bitstream; and storing the bitstream on a non-transitory computer readable storage medium, wherein the encoding method comprises:

partitioning, by an encoder, a video picture into a plurality of coding units (CUs) comprising a lossless CU; and generating, by the encoder, a high-level syntax, wherein the high-level syntax comprises a first flag that indicates whether a residual coding scheme used by a CU in the CUs or by a coding block of a CU in the CUs is switchable between a residual coding scheme used by a non-transform skip mode and a residual coding scheme used by a transform skip mode.

17. The method of claim 16, wherein the encoding method further comprises:

generating, by the encoder and when the residual coding scheme is switchable, a low-level syntax at CU level, wherein the low-level syntax comprises a residual coding scheme used by the lossless CU or a lossless coding block (CB).

18. The method of claim 16, wherein the high-level syntax comprises a second flag that signals whether the residual coding scheme can be selected.

19. The method of claim 18, wherein the high-level syntax signals 0 to indicate that a residual coding scheme used by a non-transform skip mode is applied for the lossless CU or a lossless coding block (CB).

20. The method of claim 18, wherein the high-level syntax signals 1 to indicate that the residual coding scheme can be selected; and wherein the encoding method further comprises:

generating, by the encoder, a low-level syntax to indicate which residual coding scheme is used for the lossless CU or a lossless coding block (CB).

\* \* \* \* \*